US011740254B2

(12) United States Patent
Ota et al.

(10) Patent No.: US 11,740,254 B2
(45) Date of Patent: Aug. 29, 2023

(54) AUTOMATIC ANALYSIS APPARATUS

(71) Applicants: Hitachi High-Tech Corporation, Tokyo (JP); Roche Diagnostics Operations, Inc., Indianapolis, IN (US)

(72) Inventors: Yuichiro Ota, Tokyo (JP); Takaaki Hagiwara, Tokyo (JP); Yoshihiro Yamashita, Tokyo (JP); Koshin Hamasaki, Tokyo (JP); Michaela Windfuhr, Mannheim (DE); Heike Guggemos, Mannheim (DE); Johannes Stoeckel, Mannheim (DE); Guenter Ziegler, Mannheim (DE); Michael Kuehnl, Mannheim (DE)

(73) Assignees: Hitachi High-Tech Corporation, Tokyo (JP); Roche Diagnostics Operations, Inc., Indianapolis, IN (US)

( * ) Notice: Subject to any disclaimer, the term of this patent is extended or adjusted under 35 U.S.C. 154(b) by 711 days.

(21) Appl. No.: 16/646,622

(22) PCT Filed: Nov. 29, 2018

(86) PCT No.: PCT/JP2018/044028
§ 371 (c)(1),
(2) Date: Mar. 12, 2020

(87) PCT Pub. No.: WO2019/138720
PCT Pub. Date: Jul. 18, 2019

(65) Prior Publication Data
US 2020/0209273 A1    Jul. 2, 2020

(30) Foreign Application Priority Data
Jan. 10, 2018    (JP) ................. 2018-002120

(51) Int. Cl.
*G01N 35/10*    (2006.01)

(52) U.S. Cl.
CPC ..... *G01N 35/1011* (2013.01); *G01N 35/1016* (2013.01); *G01N 2035/1025* (2013.01)

(58) Field of Classification Search
None
See application file for complete search history.

(56) References Cited

U.S. PATENT DOCUMENTS 9,588,132 B2 * 3/2017 Hattori ............. G01N 35/00623
2005/0074363 A1 * 4/2005 Dunfee .............. G01N 35/1079
422/81

(Continued)

FOREIGN PATENT DOCUMENTS

EP    3739341 A1 * 11/2020 ............. G01N 35/00
JP    3-39159 U    4/1991

(Continued)

OTHER PUBLICATIONS

Supplementary Partial European Search Report issued in European Application No. 18899724.1 dated Dec. 15, 2021 (nine (9) pages).

(Continued)

*Primary Examiner* — Brian R Gordon
(74) *Attorney, Agent, or Firm* — Crowell & Moring LLP

(57) ABSTRACT

The object of the invention is to provide an automatic analysis apparatus capable of setting a dispensing mechanism for measuring dispensing accuracy and a dispensing volume, and capable of performing dispensing accuracy measurement without absorbance measurement. Regarding a dispensing accuracy, a dispensing mechanism to be measured is designated. Parameters including a dispensing volume and the like are input. A dispensing operation of the input dispensing volume is automatically performed for each designated dispensing mechanism. A reaction vessel contains, for example, a reagent of the input dispensing volume which has been dispensed by the designated dispensing mechanism. By measuring a weight of the reagent in the (Continued)

reaction vessel, or the like, it is possible to measure the dispensing accuracy of the designated dispensing mechanism.

22 Claims, 15 Drawing Sheets

(56) References Cited

U.S. PATENT DOCUMENTS

| | | | |
|---|---|---|---|
| 2010/0104478 A1* | 4/2010 | Kondou | G01N 35/00663 |
| | | | 422/400 |
| 2013/0132006 A1* | 5/2013 | Gwynn | B01L 3/021 |
| | | | 702/55 |
| 2013/0183198 A1 | 7/2013 | Tokunaga et al. | |
| 2015/0112629 A1 | 4/2015 | Hattori | |
| 2016/0045918 A1 | 2/2016 | Lapham et al. | |
| 2017/0205321 A1 | 7/2017 | Sasaki et al. | |
| 2017/0227564 A1* | 8/2017 | Muschler | B01L 3/0262 |
| 2019/0018033 A1* | 1/2019 | Hara | G01N 35/1079 |
| 2019/0072578 A1* | 3/2019 | Buschke | G01N 35/1016 |
| 2020/0377845 A1* | 12/2020 | Watanabe | B01F 31/26 |
| 2021/0220833 A1* | 7/2021 | Nissen | B01L 9/54 |
| 2022/0034929 A1* | 2/2022 | Yokota | G01N 35/1016 |

FOREIGN PATENT DOCUMENTS

| | | |
|---|---|---|
| JP | 7-51559 A | 2/1995 |
| JP | 2007-175003 A | 7/2007 |
| JP | 2007-327779 A | 12/2007 |
| JP | 2012-18126 A | 1/2012 |
| JP | 2013-145211 A | 7/2013 |
| JP | 2013-190400 A | 9/2013 |
| JP | 2014-106166 A | 6/2014 |
| JP | 2016-217921 A | 12/2016 |
| WO | WO 2016/009764 A1 | 1/2016 |

OTHER PUBLICATIONS

International Search Report (PCT/ISA/210) issued in PCT Application No. PCT/JP2018/044028 dated Feb. 12, 2019 with English translation (five pages).

Japanese-language Written Opinion (PCT/ISA/237) issued in PCT Application No. PCT/JP2018/044028 dated Feb. 12, 2019 (six pages).

Japanese-language International Preliminary Report on Patentability (PCT/IPEA/409) issued in PCT Application No. PCT/JP2018/044028 dated Oct. 8, 2019 (12 pages).

* cited by examiner

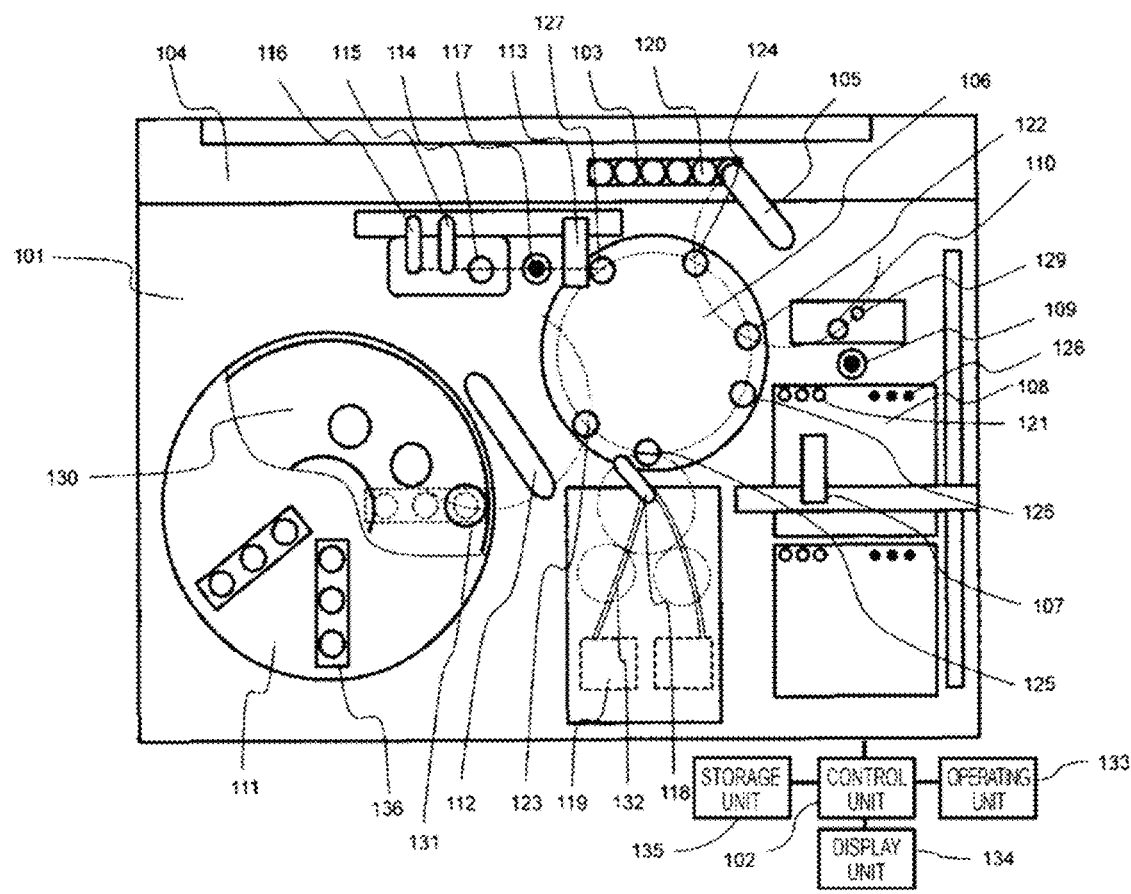
[FIG. 1]

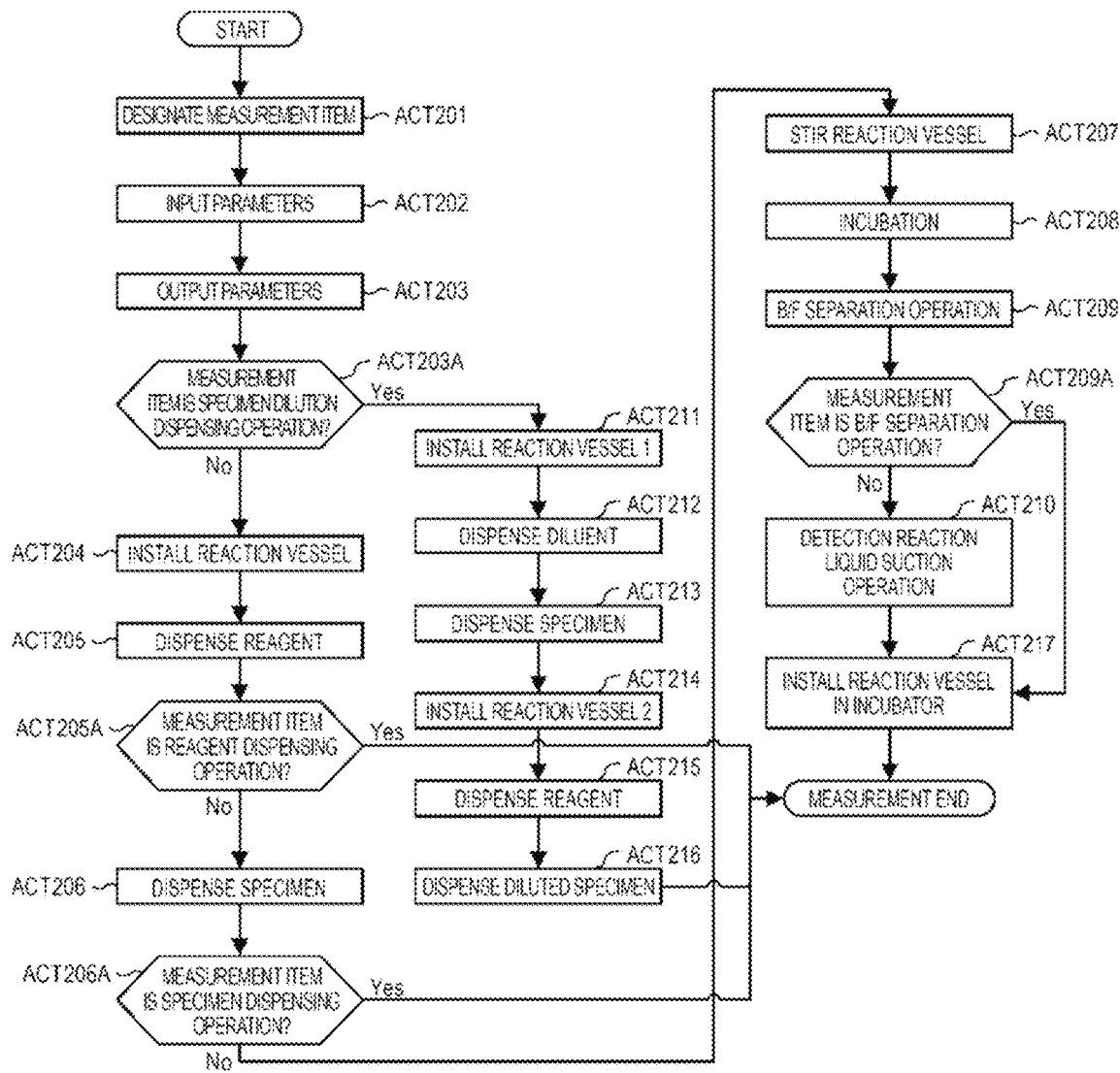

[Fig. 7]
[Fig. 8]
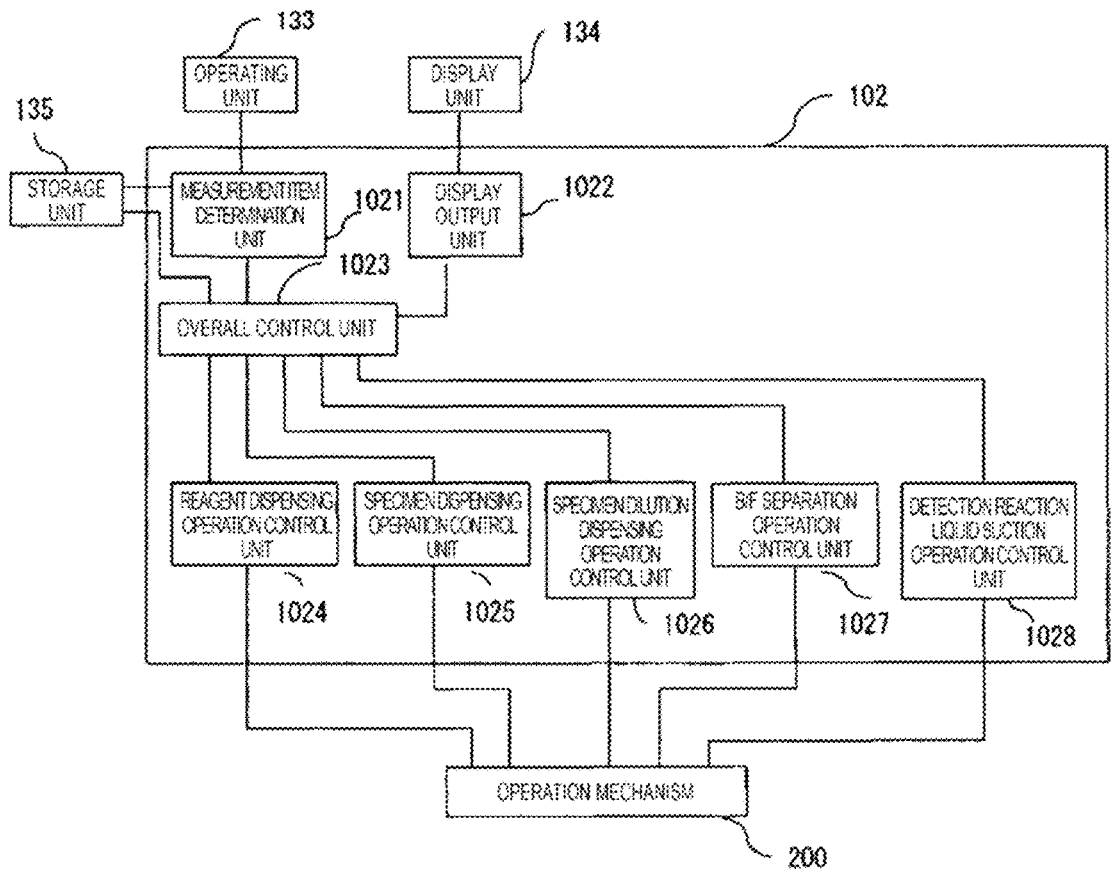

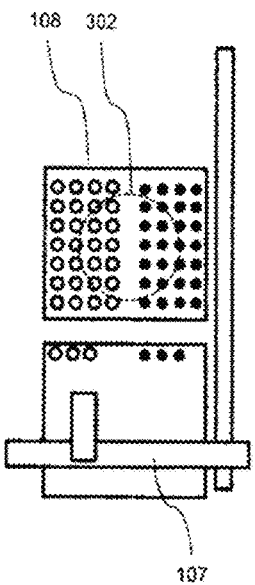
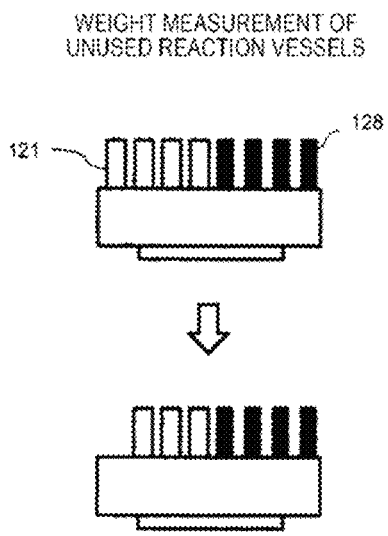
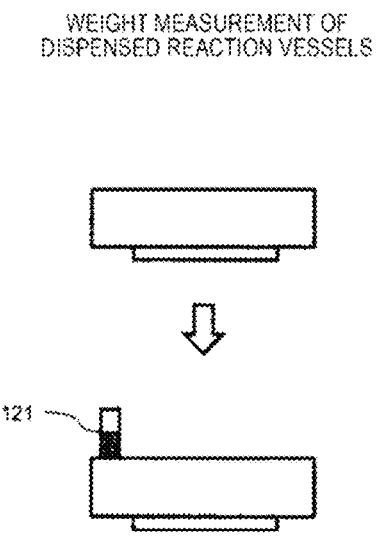
FIG. 9A     FIG. 9B     FIG. 9C
[Fig. 10]
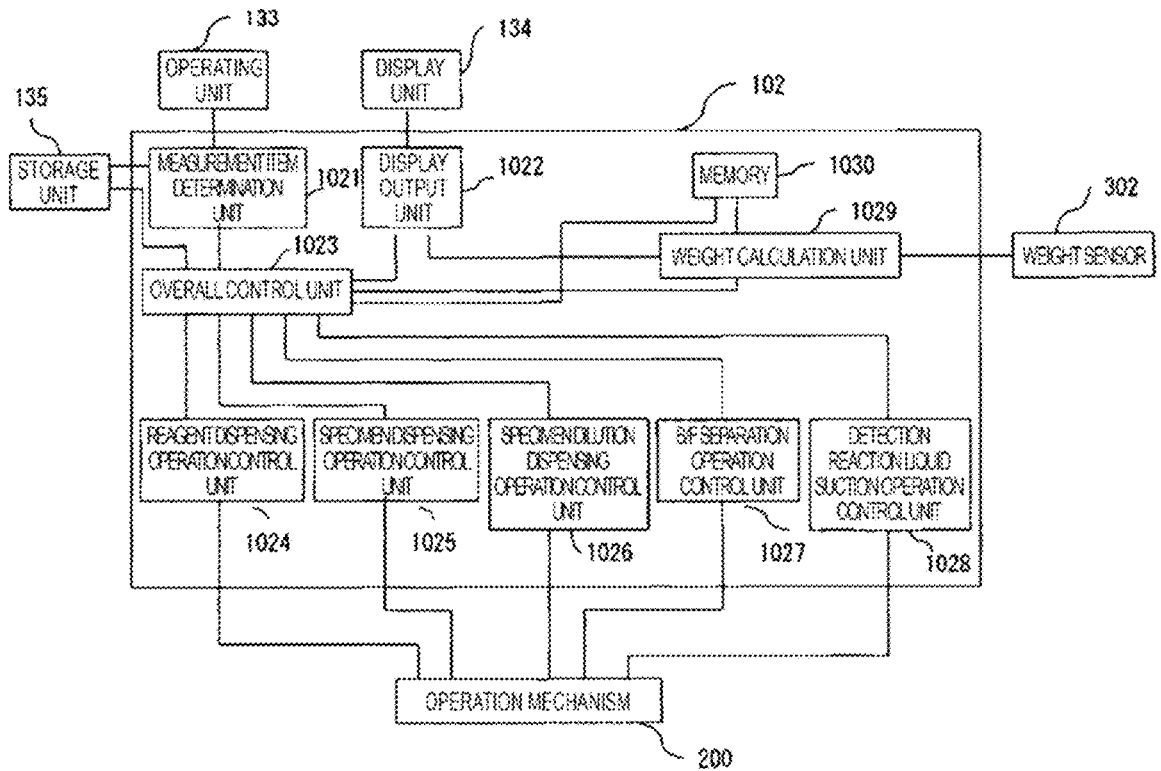

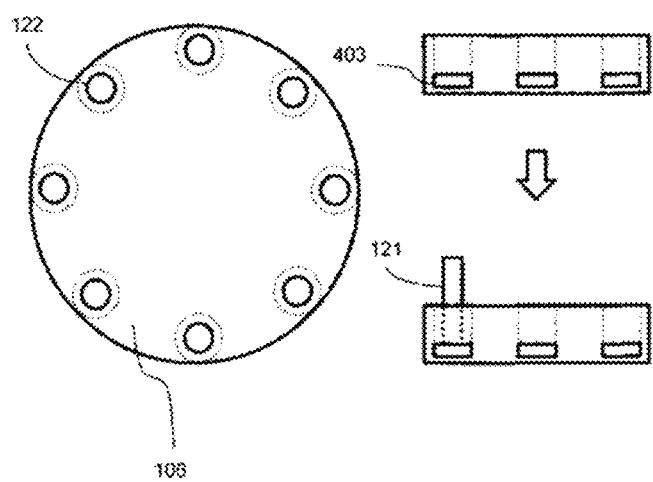
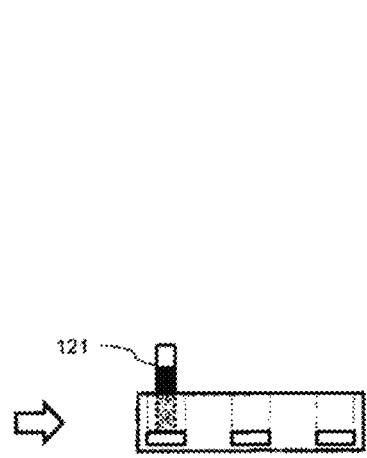
WEIGHT MEASUREMENT OF UNUSED REACTION VESSELS
WEIGHT MEASUREMENT OF DISPENSED REACTION VESSELS
FIG. 11A    FIG. 11B    FIG. 11C

[Fig. 12]
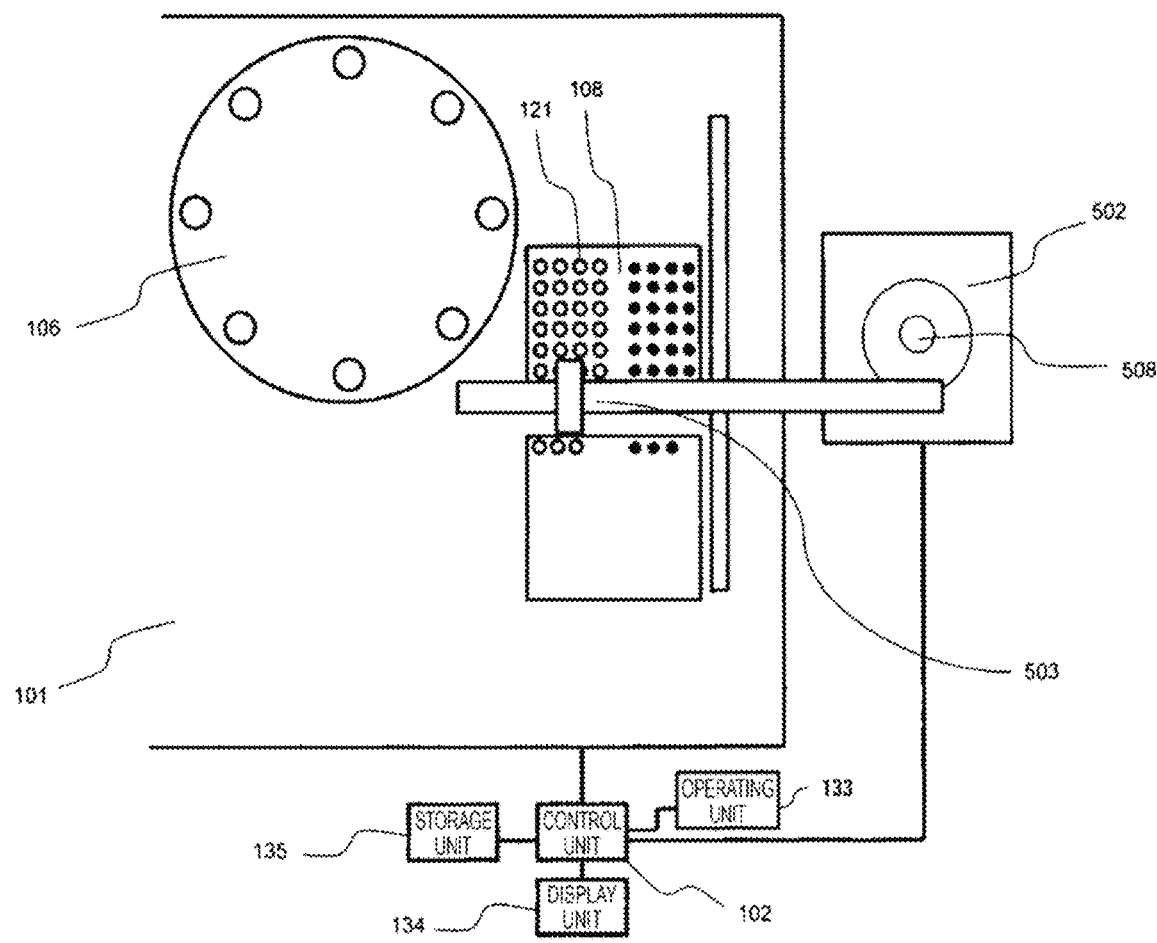

[Fig. 13]
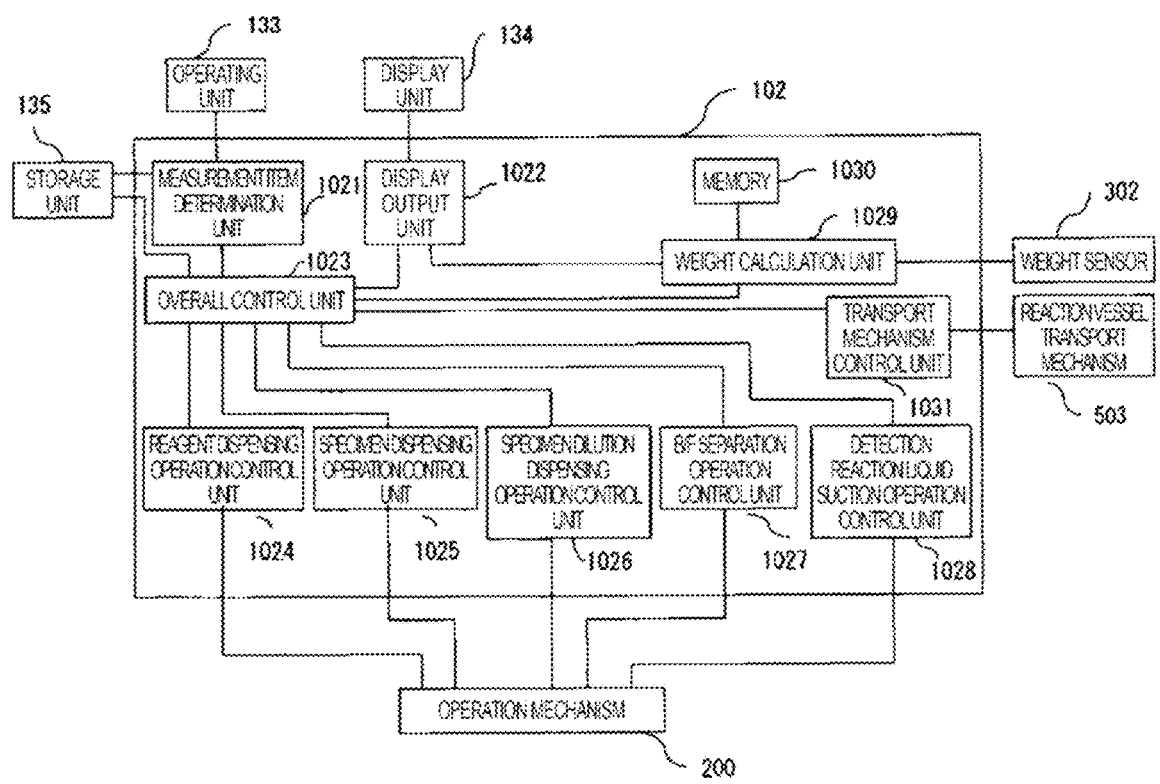

[Fig. 14]
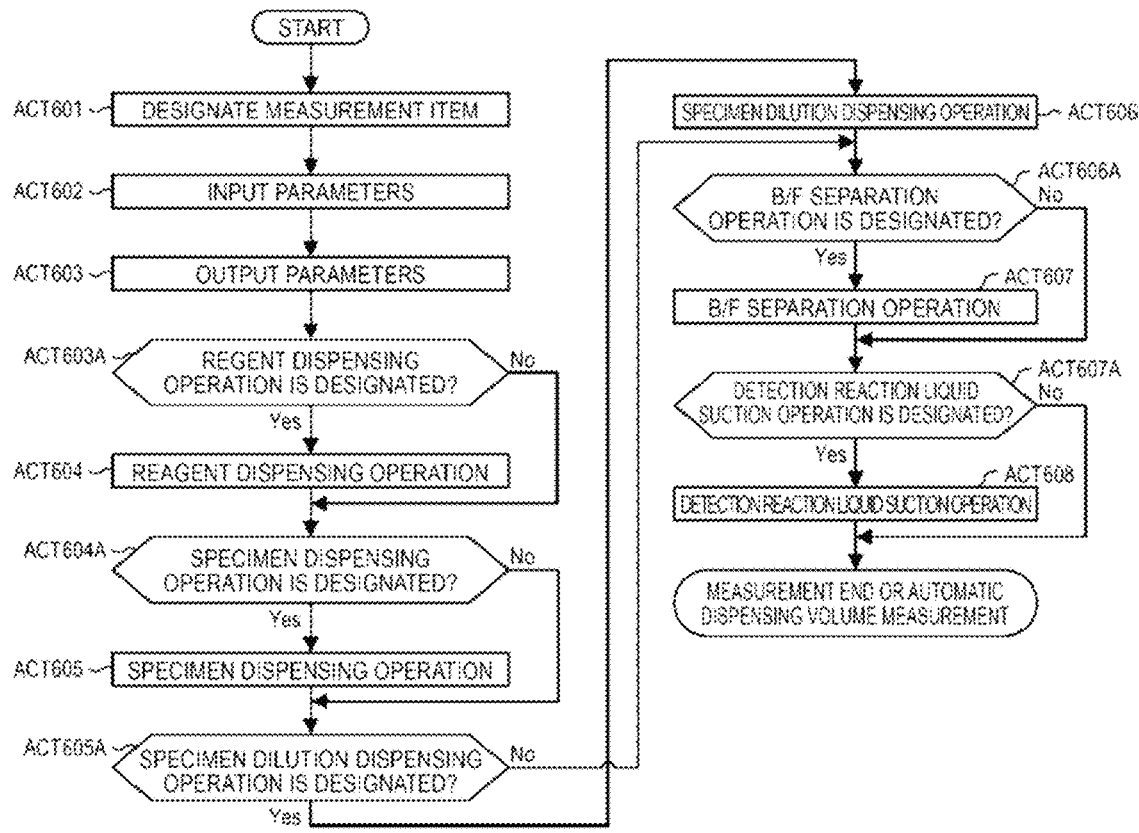

[Fig. 15]
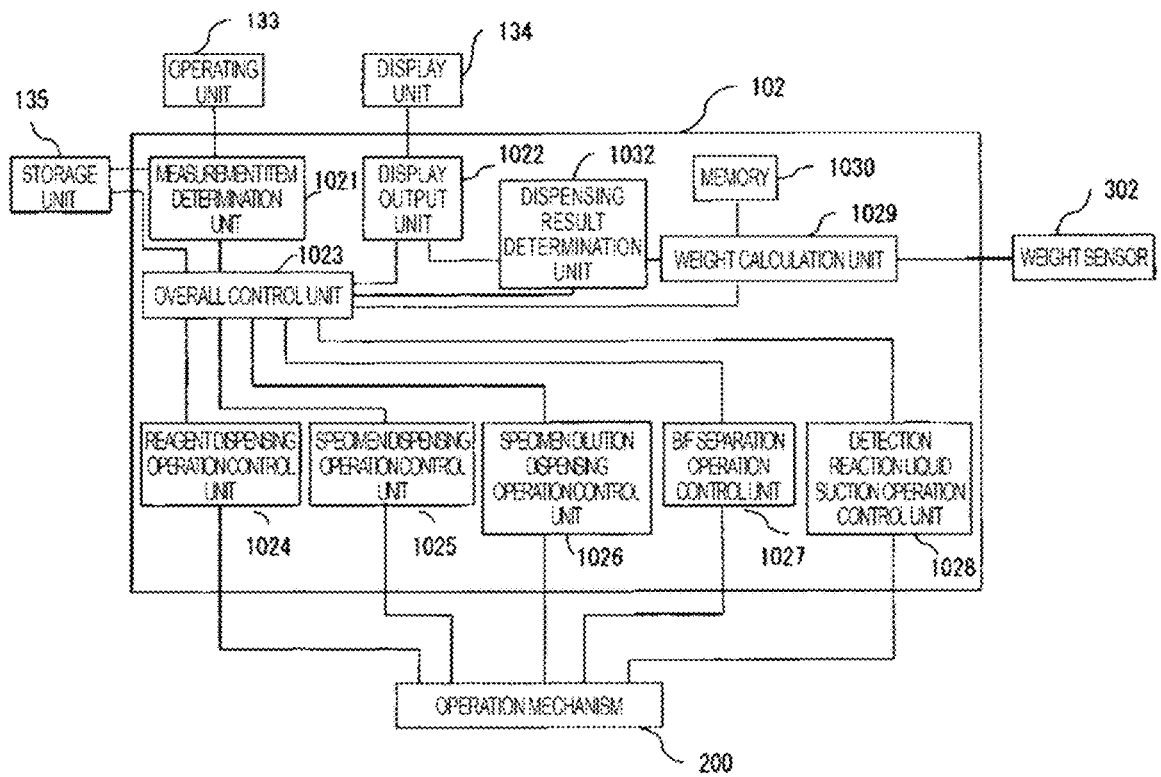
[Fig. 16]
| MEASUREMENT RESULT | ITEM | RESULT | | DETERMINATION |
|---|---|---|---|---|
| | | ACCURATE DISPENSING VOLUME | ACCURACY | |
| | REAGENT DISPENSING OPERATION | 1.6 uL | 0.6 % | OK |
| | SAMPLE DISPENSING OPERATION | 2.1 uL | 0.3 % | OK |
| | SAMPLE DISPENSING DILUTION OPERATION | 0.2 uL | 0.9 % | OK |
| | B/F SEPARATION OPERATION | 3.5 uL | 0.5 % | OK |
| | DETECTION REACTION LIQUID SUCTION OPERATION | -0.8 uL | 0.6 % | OK |
| DISPENSING OPERATION IS NORMALLY PERFORMED | | | | |

[Fig. 17]
[Fig. 18]
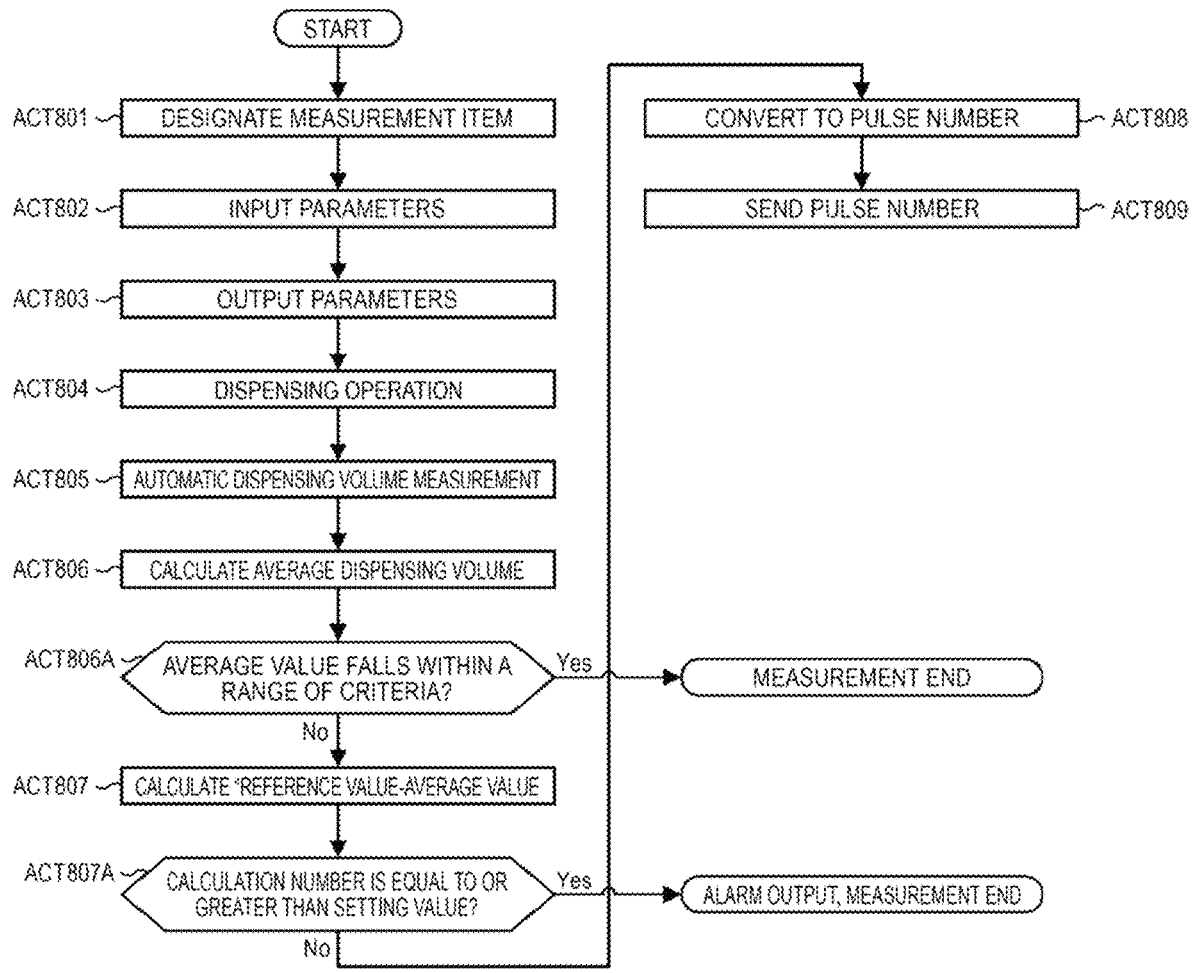

[Fig. 19]
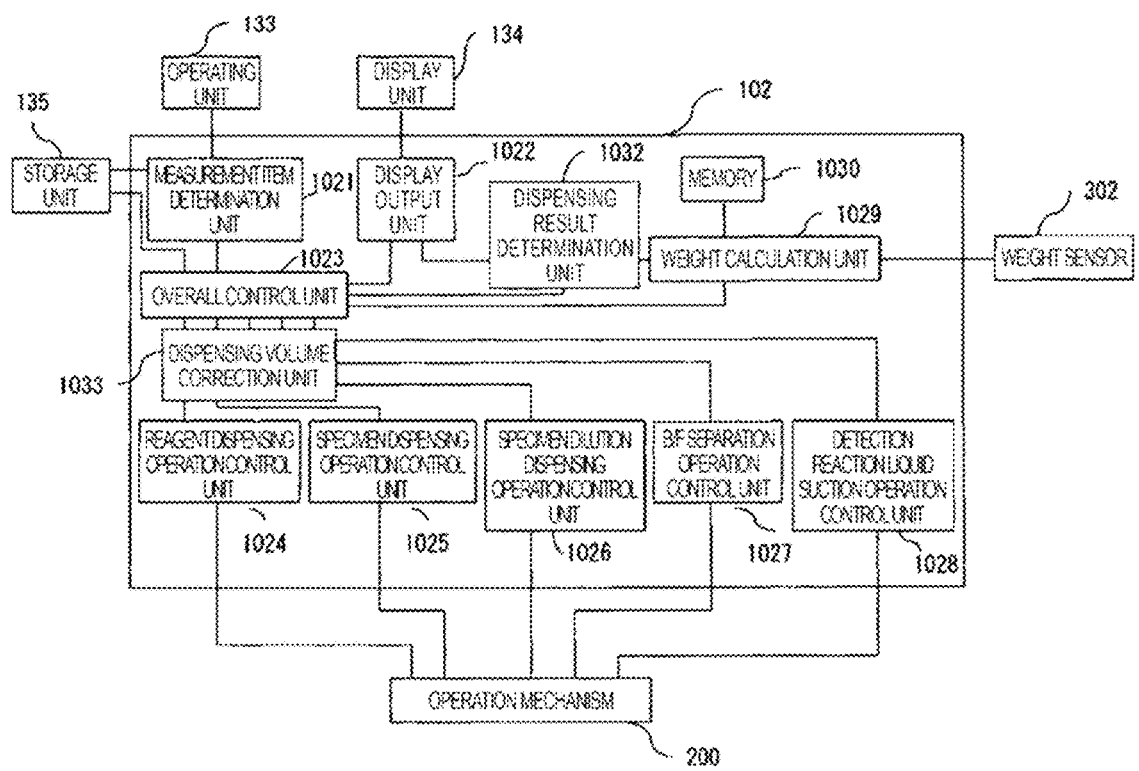

[Fig. 20]
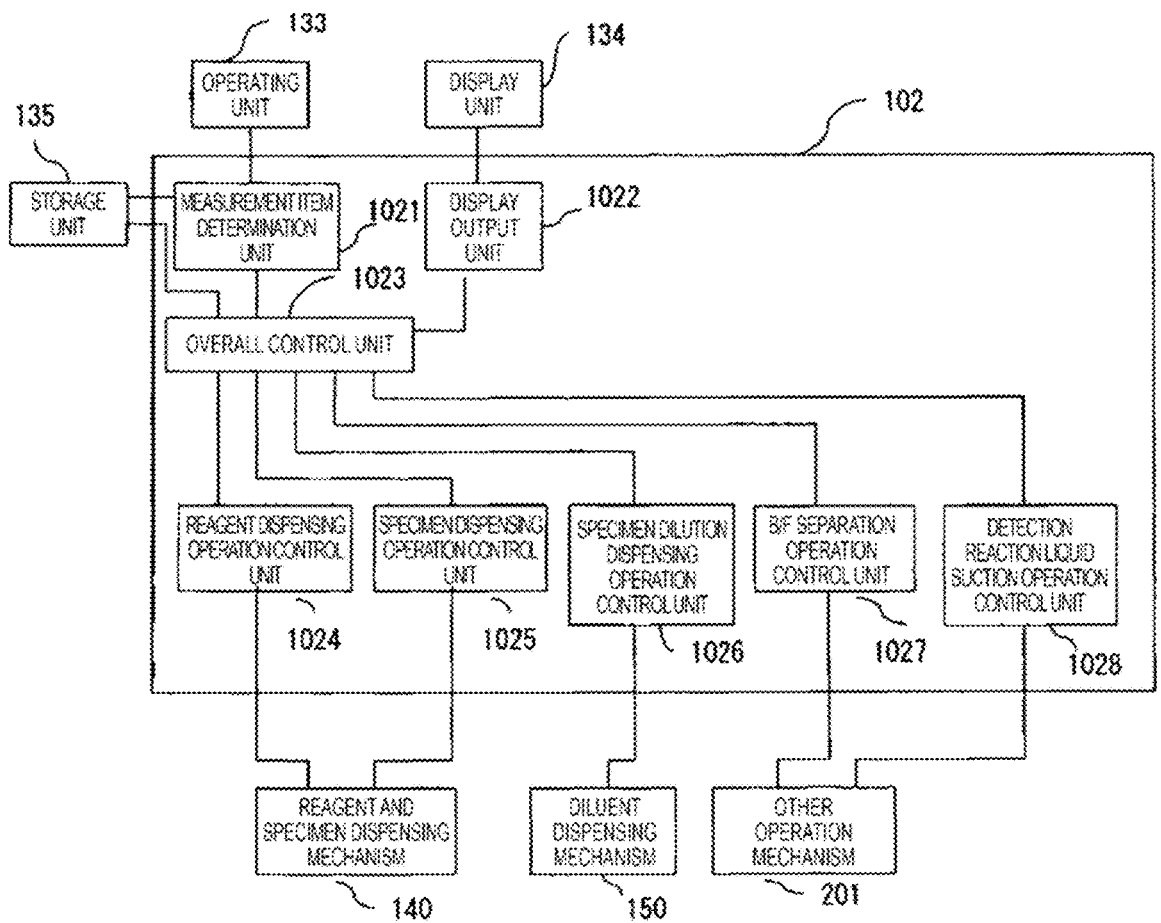

[Fig. 21]
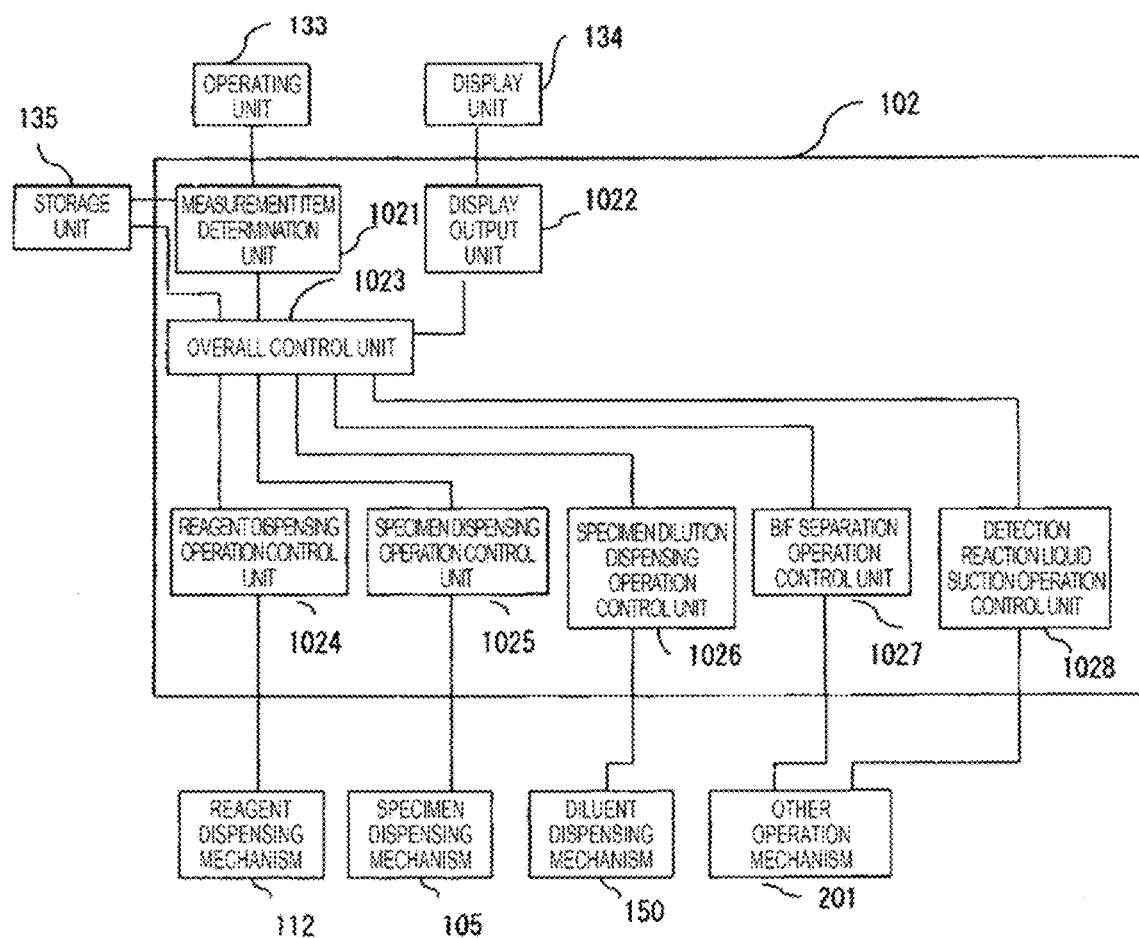

[Fig. 22]
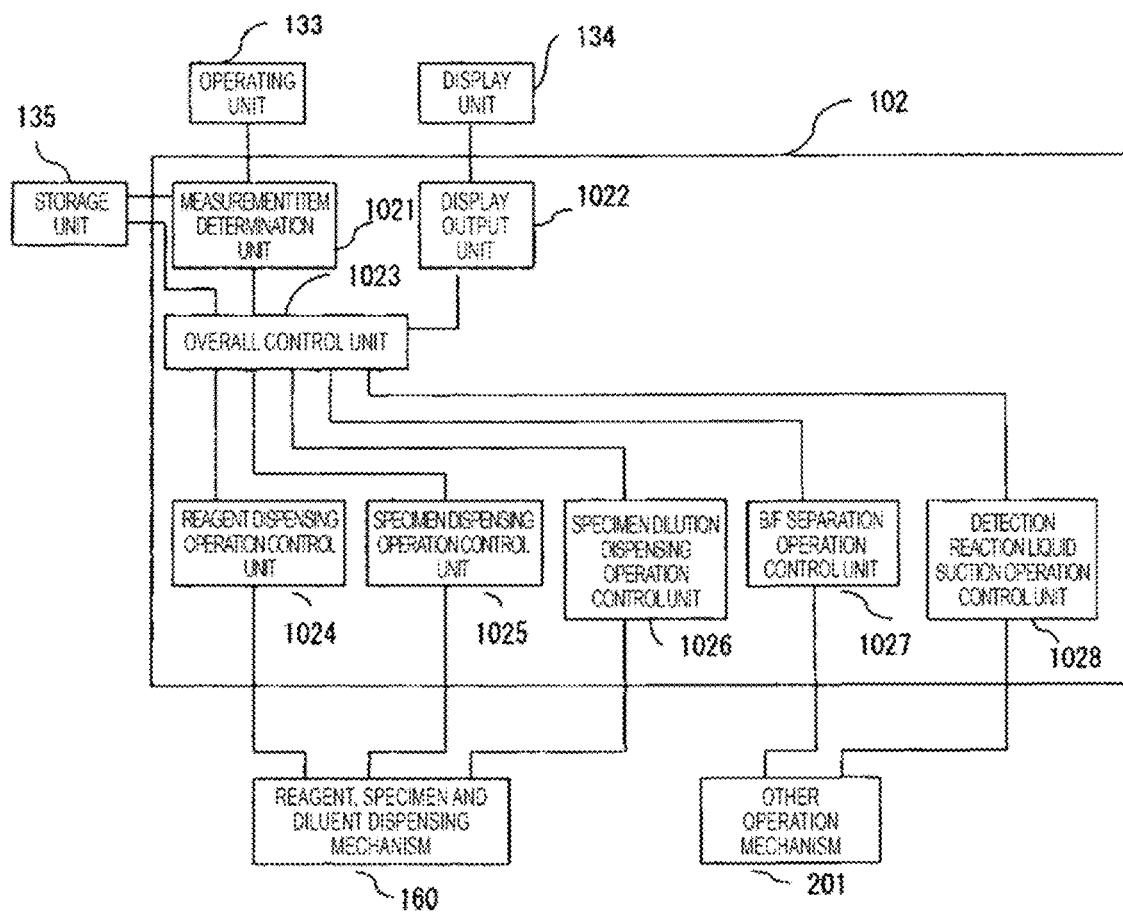

AUTOMATIC ANALYSIS APPARATUS

TECHNICAL FIELD

The present invention relates to an automatic analysis apparatus.

BACKGROUND ART

In the automatic analysis apparatus, periodic measurement of the precision control sample and determination (precision control measurement) of the quantitative value are performed, and it is confirmed that there is no abnormality in the performance of the automatic analysis apparatus.

JP-A-2007-327779 (PTL 1) describes a technique in which, after the maintenance and inspection of a dispensing mechanism for dispensing a sample or the like, the absorbance of a dye solution having a known absorbance dispensed into a vessel is obtained, and it is determined whether the dispensing accuracy of the dispensing mechanism is normal or abnormal from the accuracy and precision of an analysis result from the obtained absorbance.

CITATION LIST

Patent Literature

PTL 1: JP-A-2007-327779

SUMMARY OF INVENTION

Technical Problem

In the automatic analysis apparatus, the precision control measurement is determined based on a quantitative value, that is, a detected value of reaction liquid after the reaction process is finished. In the automatic analysis apparatus, since detection is performed by continuously operating a plurality of mechanisms, in a case where an abnormality occurs in the detected value, it is unclear which mechanism has a failure. In particular, in a case where a failure mechanism is a dispensing mechanism, it takes time to specify the cause. Further, there is a possibility that a failure occurs at a specific dispensing volume, and in this case, extraction (specification) of the failure becomes more difficult.

The technique described in PTL 1 is a method for measuring the absorbance to determine whether or not the dispensing accuracy of the dispensing mechanism is normal, but there is no viewpoint that a failure occurs at a specific dispensing volume. Therefore, the dispensing accuracy cannot be confirmed by changing the dispensing volume.

Further, in the technique described in PTL 1, it is necessary to measure the absorbance in order to confirm the dispensing accuracy, and the work of confirming the dispensing accuracy is complicated.

Here, an object of the present invention is to realize an automatic analysis apparatus that can perform dispensing accuracy measurement without measuring absorbance.

Solution to Problem

In order to achieve the above-described object, according to an aspect of the present invention, there is provide an automatic analysis apparatus including: a dispensing mechanism which sucks liquid from a first vessel and discharges the liquid to a second vessel; an analysis unit which analyzes the liquid in the second vessel; a vessel installment unit in which the second vessel is able to be installed; an input unit which receives an operation of the dispensing mechanism; a control unit which controls the dispensing mechanism in accordance with the operation received by the input unit; and a generation unit which generates a situation in which a discharge amount to the second vessel is able to be measured.

Advantageous Effects of Invention

According to the present invention, it is possible to realize an automatic analysis apparatus that can perform dispensing accuracy measurement without measuring absorbance.

BRIEF DESCRIPTION OF DRAWINGS

FIG. 1 is a schematic configuration diagram of an automatic analysis apparatus.

FIG. 2 is an operation flowchart illustrating an outline of an operation method of a designated dispensing mechanism in a first embodiment.

FIG. 3 shows an exemplified display screen in a case where a reagent dispensing operation is designated.

FIG. 4 shows an exemplified display screen in a case where a specimen dispensing operation is designated.

FIG. 5 shows an exemplified display screen in a case where a specimen dilution dispensing operation is designated.

FIG. 6 shows an exemplified display screen in a case where a B/F separation operation is designated.

FIG. 7 shows an exemplified display screen in a case where a detection reaction liquid suction operation is designated.

FIG. 8 is a block diagram of a control function of a control unit for performing dispensing volume measurement in the first embodiment.

FIGS. 9A to 9C are explanatory diagrams for showing an outline of a second embodiment and illustrating a weight measurement of the dispensing volume inside the automatic analysis apparatus.

FIG. 10 is a block diagram of a control function of a control unit for performing dispensing volume measurement in the second embodiment.

FIGS. 11A to 11C are views showing a configuration in a case where a weight sensor is installed in an incubator.

FIG. 12 is a partial explanatory diagram of a configuration of a third embodiment.

FIG. 13 is a block diagram of a control function of a control unit for performing dispensing volume measurement in the third embodiment.

FIG. 14 is an operation flowchart of a fourth embodiment.

FIG. 15 is a block diagram of a control function of a control unit in a fifth embodiment.

FIG. 16 is a view showing a display screen indicating that the dispensing operation is normal in the fifth embodiment.

FIG. 17 is a view showing a display screen indicating that the dispensing operation does not satisfy determination criteria in the fifth embodiment.

FIG. 18 is an operation flowchart of a sixth embodiment.

FIG. 19 is a block diagram of a control function of a control unit in the sixth embodiment.

FIG. 20 is a block diagram of a control function of a control unit in a seventh embodiment.

FIG. 21 is a block diagram of a control function of a control unit in an eighth embodiment.

FIG. 22 is a block diagram of a control function of a control unit in a ninth embodiment.

DESCRIPTION OF EMBODIMENTS

Hereinafter, embodiments of the present invention will be described in detail with reference to the drawings. In addition, the present embodiment is used for understanding the invention, and the scope of rights is not limited to the embodiment of the present invention.

Embodiments

First Embodiment

FIG. 1 is a schematic configuration diagram of an automatic analysis apparatus to which a first embodiment is applied. In addition, the description will be made with a case where the invention is applied to an immunoassay apparatus as an automatic analysis apparatus, as an example.

In FIG. 1, an immunoassay apparatus 101 includes a control unit 102, a specimen rack 103, a rack transport line 104, a specimen dispensing mechanism 105, an incubator (vessel installment unit) 106, a transport mechanism (reaction vessel transport mechanism) 107, and a reaction vessel holding unit 108, a reaction vessel stirring mechanism 109, and a disposal hole 110.

In addition, the immunoassay apparatus 101 includes a reagent disk 111, a reagent dispensing mechanism 112, a B/F separation transport mechanism 113, a B/F separation mechanism 114, a B/F separation reaction liquid suction mechanism 115, a buffer solution discharge mechanism (third dispensing mechanism) 116, a post B/F separation stirring mechanism 117, a detection reaction liquid suction mechanism 118, a plurality of detection units 119, and the like.

In the immunoassay apparatus 101, the specimen rack 103 has a specimen vessel 120, which holds a specimen, installed thereon. Further, the rack transport line 104 moves the specimen vessel 120 installed on the specimen rack 103 to a specimen dispensing position in the vicinity of the specimen dispensing mechanism 105.

The specimen dispensing mechanism 105 can rotate and move up and down, sucks the specimen held in the specimen vessel 120, and discharges the sucked specimen into the reaction vessel 121 on the incubator 106.

The incubator 106 is configured such that a plurality of reaction vessels 121 can be installed. The incubator 106 is a reaction disk for reacting the liquid contained in the reaction vessel 121, and performs a rotation operation for moving the reaction vessel 121 installed in the circumferential direction to a predetermined position such as a reaction vessel installment position 122, a reagent discharge position 123, a specimen discharge position 124, a detection reaction liquid suction position 125, a reaction vessel disposal position 126, a B/F separation transport position 127, and the like.

The transport mechanism 107 is movable in three directions of an X axis, a Y axis, and a Z axis, moves within a range of a predetermined location of the reaction vessel holding unit 108, the reaction vessel stirring mechanism 109, the disposal hole 110, a tip mounting position 129 of a specimen dispensing tip 128, and the incubator 106, and transports the specimen dispensing tip 128 or the reaction vessel 121.

The reaction vessel holding unit 108 has a plurality of unused reaction vessels 121 and a plurality of specimen dispensing tips 128 which are installed thereon.

The reaction vessel stirring mechanism 109 is a stirring mechanism that mixes the specimen and the reagent with each other in the reaction vessel 121 by applying a rotational motion to the reaction vessel 121.

The disposal hole 110 is a hole for disposing of the specimen dispensing tip 128 and the reaction vessel 121 which are used.

The reagent disk 111 has a plurality of reagent vessels 129, which hold reagents, installed thereon. The inside of the reagent disk 111 is maintained at a predetermined temperature, and a cover 130 is provided above the reagent disk 111. A cover aperture 131 is provided at a part of the cover 130.

The reagent dispensing mechanism 112 can rotate and move up and down, and is configured to suck the reagent held in the reagent vessel 136 in the reagent disk 111 and discharge the sucked reagent to the reaction vessel 121 on the incubator 106.

The B/F separation transport mechanism 113 moves the reaction vessel 121 on the incubator 106 after a predetermined time has elapsed from the B/F separation transport position 127 to the B/F separation mechanism (processing mechanism) 114.

The B/F separation mechanism 114 is a mechanism that separates a reaction liquid that does not contain magnetic particles and magnetic particles from each other by magnetically adsorbing magnetic particles that contain a substance immunologically bound to the measurement target present in the reaction liquid contained in the reaction vessel 121, to the inner wall of the reaction vessel 121.

The B/F separation reaction liquid suction mechanism 115 is configured such that the X axis and the Z axis can move, moves and descends above the reaction vessel 121 after a predetermined time has elapsed on the B/F separation mechanism 114, and sucks the reaction liquid that does not contain the magnetic particles in the reaction vessel 121.

The buffer solution discharge mechanism 116 is configured such that the X axis and the Z axis can move, moves and descends above the reaction vessel 121 to which the reaction liquid that does not contain the magnetic particles is sucked on the B/F separation mechanism 114, and discharges a buffer solution into the reaction vessel 121.

After the post B/F separation stirring mechanism 117 applies a rotational motion to the reaction vessel 121 and mixes the magnetic particles in the reaction vessel 121 with the buffer solution. The reaction vessel 121 after the mixing is transported by the B/F separation transport mechanism 117 to the B/F separation transport position 127 of the incubator 106.

The detection reaction liquid suction mechanism 118 is a mechanism that can rotate and move up and down, and sucks the reaction liquid contained in the reaction vessel 121 on the incubator 106 to send the sucked reaction liquid to the detection unit 119.

Regarding the detection unit (analysis unit) 119, a plurality of detection units 119 are installed for shortening the measurement time, and concentration or the like of detection target in the reaction liquid sucked and sent from the detection reaction liquid suction mechanism 118 is detected (analyzed).

Next, an analysis operation in the first embodiment of the automatic analysis apparatus will be described.

The control unit 102 receives a measurement input signal from an operating unit 133, outputs a control signal to each mechanism in the automatic analysis apparatus in order to perform analysis, and controls the operation thereof.

First, the transport mechanism 107 moves and descends above the reaction vessel holding unit 108, and grasps the unused reaction vessel 121 and ascends. After this, the transport mechanism 107 moves and descends above the reaction vessel installment position 122 of the incubator 106, and installs the unused reaction vessel 121 on the incubator 106.

In addition, the transport mechanism 107 moves and descends above the reaction vessel holding unit 108, and grasps the unused specimen dispensing tip 128 and ascends. After this, the transport mechanism 107 moves and descends above the tip mounting position 129, and installs the unused specimen dispensing tip 128 on the tip mounting position 129. After this, the nozzle of the specimen dispensing mechanism 105 moves and descends above the tip mounting position 129, and mounts the specimen dispensing tip 128 at the tip end of the dispensing nozzle of the specimen dispensing mechanism 105.

The nozzle of the reagent dispensing mechanism 112 is rotated and descends above the aperture 131 of the reagent disc cover 130, brings the tip end of the nozzle of the reagent dispensing mechanism 112 into contact with a reagent in a predetermined reagent vessel 136, and sucks a predetermined amount of reagent. Next, the nozzle of the reagent dispensing mechanism 112 moves above the reagent discharge position 123 of the incubator 106 and discharges the reagent to the reaction vessel 121 installed in the incubator 106.

The nozzle of the specimen dispensing mechanism 105 on which the specimen dispensing tip 128 is mounted moves and descends above the specimen vessel 120 disposed on the specimen rack 103, and sucks a predetermined amount of specimen held in the specimen vessel 120. After this, the nozzle of the specimen dispensing mechanism 105 that has sucked the specimen moves and descends to the specimen discharge position 124 of the incubator 106, and discharges the specimen into the reaction vessel 121, to which the reagent is dispensed, on the incubator 106. After the discharge of the specimen, the nozzle of the specimen dispensing mechanism 105 performs a mixing operation. After the mixing operation is completed, the nozzle of the specimen dispensing mechanism 105 moves above the disposal hole 110, and disposes of the used specimen dispensing tip 128 into the disposal hole 110.

After this, the control unit 102 moves the reaction vessel 121 in which the specimen and the reagent are mixed with each other to the reaction vessel installment position 122 by rotating the incubator 106, and transports the reaction vessel 121 to the reaction vessel stirring mechanism 109 by the transport mechanism 107.

The reaction vessel stirring mechanism 109 applies the rotational motion to the reaction vessel 121, and stirs the specimen and the reagent in the reaction vessel 121 to mix the specimen and the reagent with each other. After this, the control unit 102 returns the reaction vessel 121 in which the stirring is finished to the reaction vessel installment position 122 of the incubator 106 by the transport mechanism 107.

The control unit 102 selectively performs the following B/F separation step in accordance with an analysis protocol. First, the reaction vessel 121 after a predetermined time has elapsed on the incubator 106 is moved to the B/F separation transport position 127 by the rotation of the incubator 106, and is transported to the B/F separation mechanism 114 by the B/F separation transport mechanism 113.

Next, the B/F separation mechanism 114 magnetically adsorbs the magnetic particles that contain a substance immunologically bound to the measurement target present in the reaction liquid of the reaction vessel 121 to the inner wall of the reaction vessel 121, moves and lowers the nozzle of the B/F separation reaction liquid suction mechanism 115 above the reaction vessel 121 after a predetermined time has been elapsed on the B/F separation mechanism 114, and sucks the reaction liquid that does not contain the magnetic particles in the reaction vessel 121.

Next, the nozzle of the buffer solution discharge mechanism 116 is moved and lowered above the reaction vessel 121 into which the reaction liquid that does not contain the magnetic particles is sucked on the B/F separation mechanism 114, the buffer solution is discharged into the reaction vessel 121, and the reaction vessel 121 is transported to the post B/F separation stirring mechanism 117 by the B/F separation transport mechanism 113.

After this, in the post B/F separation stirring mechanism 117, the rotational motion is applied to the reaction vessel 121, and the magnetic particles in the reaction vessel 121 are mixed with the buffer solution. The reaction vessel 121 in which the stirring is finished is returned to the B/F separation transport position 127 of the incubator 106 by the post B/F separation transport mechanism 113.

Next, a detection step of detecting the measurement target in the reaction liquid is performed.

First, the reaction vessel 121 to which the specimen and the reagent are dispensed and after a predetermined time has elapsed on the incubator 106, or the reaction vessel 121 in which the B/F separation is performed, is moved to the detection reaction liquid suction position 125. After the reaction vessel 121 moves to the detection reaction liquid suction position 125, and after the nozzle of the detection reaction liquid suction mechanism 118 is moved and lowered above the reaction vessel 121, the reaction liquid in the reaction vessel 121 is sucked. The reaction liquid is sent to the flow cell type detection unit 119 via a liquid transport channel 132, and the detection unit 119 detects the measurement target.

The control unit 102 derives the measurement result (the concentration or the like of the detection target in the specimen) based on the detected value of the measurement target detected by the detection unit 119, and stores the derived measurement result in a storage unit 135. Further, the measurement result is displayed using a display unit 134 such as a display.

Further, the control unit 102 moves the reaction vessel 121 to which the reaction liquid is sucked to the reaction vessel disposal position 126 by the rotation of the incubator 106, moves the reaction vessel from the incubator 106 to above the disposal hole 110 by the transport mechanism 107, and disposes of the reaction vessel from the disposal hole 110.

Depending on the analysis protocol, the specimen dilution dispensing operation is selectively performed. Since the detailed operation is the same as the above-described analysis operation, only the difference from the specimen dilution dispensing operation will be described.

In the specimen dilution dispensing operation, the dilution operation is performed using the reagent vessel 136 containing the diluent in the above-described analysis operation. First, the diluent is sucked by the nozzle of the reagent dispensing mechanism 112 and discharged to the reaction vessel 121. Next, the specimen is sucked by the nozzle of the specimen dispensing mechanism 105, and the specimen is discharged to the reaction vessel 121 to which the diluent is dispensed. After the specimen is discharged, the nozzle of the specimen dispensing mechanism 105 performs a mixing operation, and a diluted specimen is generated in the reaction vessel 121.

Next, the unused reaction vessel 121 is installed on the incubator 106. After the installation of the reaction vessel 121, the reagent is sucked by the nozzle of the reagent dispensing mechanism 112 and discharged to the unused reaction vessel 121. After the discharge of the reagent, the nozzle of the specimen dispensing mechanism 105 sucks the diluted specimen from the reaction vessel 121 that contains the diluted specimen and discharges the sucked diluted specimen to the reaction vessel 121 that contains the reagent.

After this, the reaction process and the B/F separation process in the incubator 106 are selectively performed, and the reaction liquid is detected.

The above is the analysis operation in the automatic analysis apparatus.

Next, a dispensing volume measurement operation in the first embodiment will be described. First, the operation method of the designated dispensing mechanism will be described.

FIG. 2 is an operation flowchart illustrating an outline of the operation method of the designated dispensing mechanism in the first embodiment.

Figures 4, 5, 6:
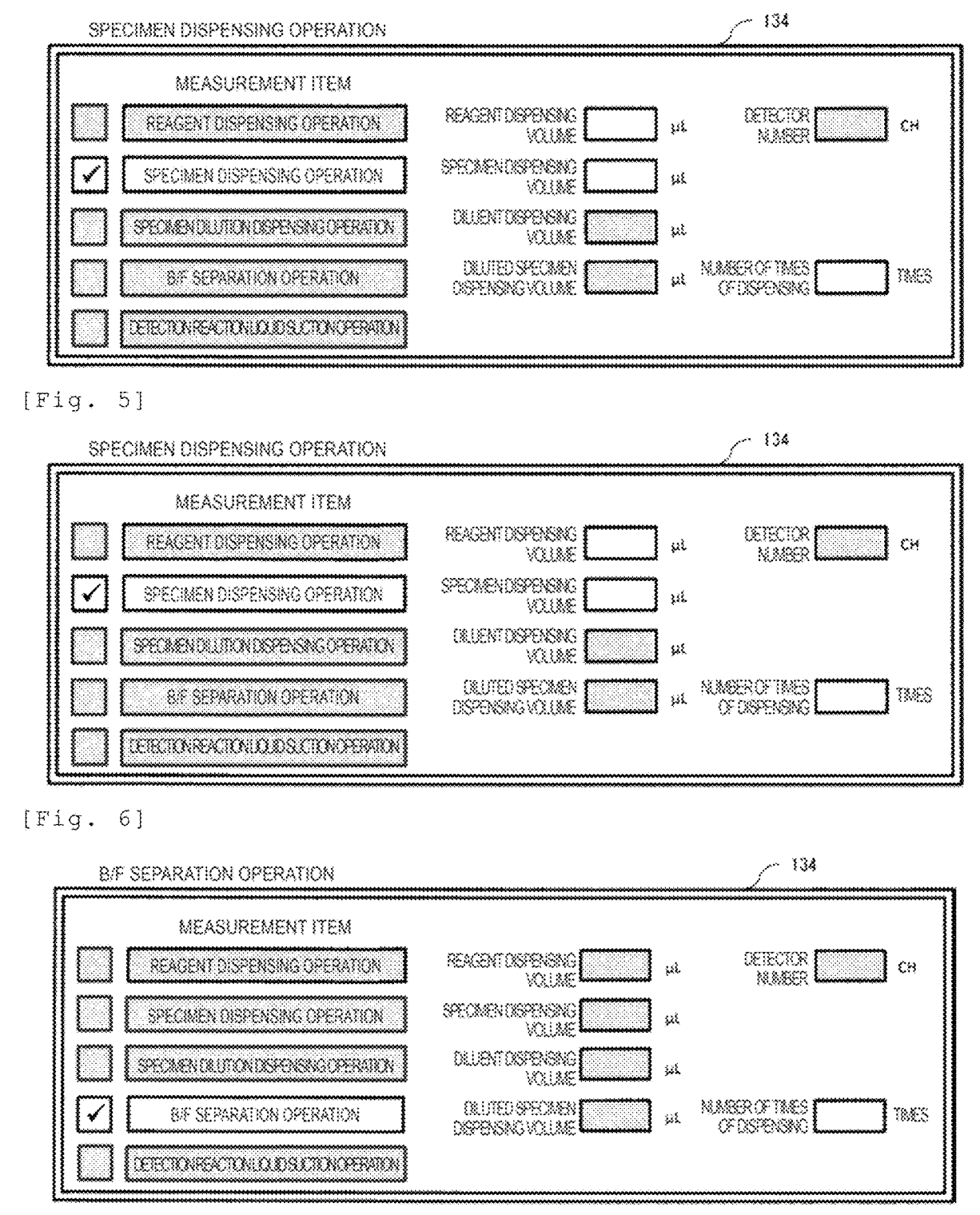

FIG. 3 is a diagram illustrating an exemplified display screen on the display unit 134 in a case where a reagent dispensing operation is designated, and FIG. 4 is a diagram illustrating an exemplified display screen on the display unit 134 in a case where a specimen dispensing operation is designated. FIG. 5 is a diagram illustrating an exemplified display screen on the display unit 134 in a case where a specimen dilution dispensing operation is designated, and FIG. 6 is a diagram illustrating an exemplified display screen on the display unit 134 in a case where a B/F separation operation is designated. FIG. 7 is a diagram illustrating an exemplified display screen on the display unit 134 in a case where the detection reaction liquid suction operation is designated.

FIG. 8 is a block diagram of a control function of the control unit 102 for performing the dispensing volume measurement in the first embodiment. In FIG. 8, the control unit 102 includes: a measurement item determination unit 1021 that determines a measurement item of the designated dispensing volume measurement, which is an operation command input from the operating unit 133; an overall control unit 1023; and a display output unit 1022 for performing display on the display unit 134 in accordance with the command from the overall control unit 1023. In addition, the control unit 102 includes: a reagent dispensing operation control unit 1024 that controls the operation of the reagent dispensing mechanism 112 in accordance with the command from the overall control unit 1023; a specimen dispensing operation control unit 1025 that controls the operation of the specimen dispensing mechanism 105; a specimen dilution dispensing operation control unit 1026 that controls the operations of the reagent dispensing mechanism 112 and the specimen dispensing mechanism 105 in the specimen dilution dispensing operation; a B/F separation operation control unit 1027 that controls the operations of the B/F separation reaction liquid suction mechanism 115 and the buffer solution discharge mechanism 116; and a detection reaction liquid suction operation control unit 1028 that controls the operation of the detection reaction liquid suction mechanism 118.

In addition, an operation mechanism 200 of FIG. 8 shows the reagent dispensing mechanism 112, the specimen dispensing mechanism 105, the B/F separation reaction liquid suction mechanism 115, the buffer solution discharge mechanism 116, and the detection reaction liquid suction mechanism 118.

First, an operator installs the reaction vessel 121, the specimen dispensing tip 128, the reagent vessel 136, the specimen vessel 120, and the like in the automatic analysis apparatus.

After the installation, a GUI of the display unit 134 is displayed, and the measurement item is designated by the operating unit 133 (S201 (input of operation command) in FIG. 2). As shown in FIGS. 3, 4, 5, 6, and 7, the measurement item can designate the reagent dispensing operation, the specimen dispensing operation, the specimen dilution dispensing operation, the B/F separation operation, and the detection reaction liquid suction operation.

Next, parameters for the designated dispensing operation are input (S202 (input of operation command)).

In S202, in a case where the reagent dispensing operation is designated, the reagent dispensing volume and the dispensing frequency can be input. In a case where the specimen dispensing operation is designated, the reagent dispensing volume, the specimen dispensing operation, and the dispensing frequency can be input. In a case where the specimen dilution dispensing operation is designated, the reagent dispensing volume, the specimen dispensing volume, the diluent dispensing volume, the diluted specimen dispensing volume, and the dispensing frequency can be input. In a case where the B/F separation operation is designated, the dispensing frequency can be input. In the B/F separation operation, since the reaction liquid is all sucked by the nozzle of the B/F separation reaction liquid suction mechanism 115, the reagent dispensing volume and the specimen dispensing volume are fixed values.

In a case where the detection reaction liquid suction operation is designated, the number of the detector to be measured and the dispensing frequency can be input.

In addition, the upper limit of the measurement frequency is the maximum number of the reaction vessel installment positions 122 of the incubator 106.

In S202, after the parameters are input, when an execution button displayed on the display unit 134 is pressed, the input parameters are stored in the storage unit 135 from the measurement item determination unit 1021, and the overall control unit 1023 outputs an operation control command based on the stored parameters (S203). Further, the overall control unit 1023 controls the display output unit 1022 to display the operation state and the like of the operation mechanism 200.

Next, each dispensing operation will be described. However, since the detailed operation is the same as the above-described analysis operation, the description thereof will be omitted.

1. Reagent Dispensing Operation

The measurement item determination unit 1021 determines whether or not the input measurement item is a specimen dilution dispensing operation (S203A). When the reagent dispensing operation is designated, since the operation is not the specimen dilution dispensing operation, the transport mechanism 107 installs the reaction vessel 121 in the incubator 106 from the reaction vessel holding unit 108 (S204), and dispenses the set dispensing volume of reagent (S205). The reagent dispensing is repeatedly operated in accordance with the dispensing frequency input in S202.

2. Specimen Dispensing Operation

Subsequent to S205, it is determined whether or not the measurement item is a reagent dispensing operation (S205A). When the measurement item is the reagent dispensing operation, the measurement is finished in a state where the reaction vessel 121 is installed in the incubator 106. In S205A, when the measurement item is not the reagent dispensing operation, the set dispensing volume of specimen is dispensed to the reaction vessel 121 installed in the incubator 106 (S206). The specimen dispensing is repeatedly operated in accordance with the input dispensing frequency. In a case where the reagent dispensing volume is set to 0, the reagent dispensing operation (S205) is not performed. Subsequent to S206, it is determined whether or not the measurement item is a specimen dispensing operation (S206A), and when the measurement item is the specimen dispensing operation, the measurement is finished in a state where the reaction vessel 121 is installed in the incubator 106.

3. B/F Separation Operation

In S206, when the measurement is not the specimen dispensing operation, the reaction vessel 121 is stirred by the reaction vessel stirring mechanism 109 (S207), and a predetermined time elapses on the incubator 106 (incubation) (S208). After a predetermined time elapses, the reaction vessel 121 is transported to the B/F separation mechanism 114 to perform the B/F separation operation (S209). By the B/F separation operation, the reaction liquid in the reaction vessel 121 is sucked, and the buffer solution is discharged. Next, it is determined whether or not the measurement item is the B/F separation operation (S209A), and when the measurement item is the B/F separation operation, after the B/F separation transport mechanism 117 installs the reaction vessel 121 in the incubator 106 (S217), the measurement is finished. Furthermore, the operation is repeatedly performed in accordance with the input dispensing frequency.

4. Detection Reaction Liquid Suction Operation

In S209A, when it is determined that the measurement item is not the B/F separation operation, the reaction vessel 121 is installed in the incubator 106, and the detection reaction liquid suction operation by the selected detector is performed (S210). In addition, the detection of the reaction liquid is not performed because the suction operation is confirmed. The operation is repeatedly performed in accordance with the input dispensing frequency. After this, the measurement is finished in a state where the reaction vessel 121 is installed in the incubator 106 (S217).

5. Specimen Dilution Dispensing Operation

In S203A, when it is determined that the measurement item is the specimen dilution dispensing operation, the transport mechanism 107 installs the reaction vessel 121 which is the first from the reaction vessel holding unit 108 in the incubator 106 (S211). After this, the set dispensing volume of diluent is dispensed (S212), and then, the set dispensing volume of specimen is dispensed (S213). Next, the reaction vessel 121 which is the second from the reaction vessel holding unit 108 is installed in the incubator 106 (S214), and thereafter, the set dispensing volume of reagent is dispensed (S215). Then, the set dispensing volume of diluted specimen is dispensed from the first reaction vessel 121 to the second reaction vessel 121 to which the reagent is dispensed (S216), and the measurement is finished. In addition, the operation is repeatedly performed in accordance with the set input dispensing frequency.

A state where the reaction vessel 121 is installed on the incubator 106 is achieved such that the operator can easily collect the reaction vessel 121 (S217). In addition, in order to specify each reaction vessel 121, the number is written on the incubator 106, and the reaction vessels 121 may be installed in numerical order. Furthermore, the temperature control of the incubator 106 may be stopped during the measurement (during the operation of the dispensing mechanism) in order to prevent the reaction liquid in the reaction vessel 121 from evaporating. After all the dispensing operations in accordance with the measurement frequency and the installation of the reaction vessel 121 in the incubator 106 are completed, the automatic analysis apparatus is automatically stopped, and the display unit 134 displays the completion of the operation. After the display, the operator can collect the reaction vessel 121 to which the reagent is dispensed on the incubator 106.

The above is the operation method of the designated dispensing mechanism.

Next, a dispensing volume measurement method will be described.

After collecting the reaction vessel 121, to which the reagent is dispensed, on the incubator 106, the dispensing volume of the reaction liquid can be measured using any method.

For example, the dispensing volume of the collected reaction liquid can be measured by a gravimetric method using an electronic balance. In this method, first, the weights of the unused reaction vessels 121 of which the number corresponds to the measurement frequency are measured by the electronic balance before measuring the dispensing volume. Next, all unused reaction vessels 121 of which the weights have been measured are installed in the reaction vessel holding unit 108, and the designated dispensing operation is performed. After the dispensing operation is completed, the reaction vessel 121 to which the reagent is dispensed is collected. After the collection, the weight of the reaction vessel 121 to which the reagent is dispensed is measured by the electronic balance, and the dispensing volume is calculated from the difference before and after the measurement.

In addition to the gravimetric method, the amount of the collected reaction liquid can be measured by an absorption photometry using a spectrophotometer. In this method, a dye is used for a reagent or a specimen.

For example, a procedure for measuring the reagent dispensing by an absorption photometry using orange G as a dye will be described.

First, a calibration curve is created using a spectrophotometer. First, the reagent dispensing volume and the specimen dispensing volume to be input in advance are determined. Next, a reagent orange G and a specimen solution are prepared. Next, the reagent orange G and the specimen solution are mixed with each other such that the reagent dispensing volume and the specimen dispensing volume to be input have the same concentration. Furthermore, based on the concentration, a mixed solution having one or more different concentrations before and after is prepared.

Next, each absorbance at 476 nm to 482 nm of the adjusted orange G mixed solution is measured using the spectrophotometer. When the absorbance is saturated at the time of measurement in the spectrophotometer, the reagent orange G is adjusted again. When the concentration does not saturate, a calibration curve (approximate expression) is created from the measured absorbance, with the horizontal axis representing the concentration and the vertical axis representing the absorbance.

After creating the calibration curve, the adjusted orange G is sealed in the reagent vessel 136, and the reagent vessel 136 is installed on the reagent disk 111. Further, a specimen solution is dispensed into the specimen vessel 120.

Next, the reagent dispensing operation is designated, the reagent dispensing volume and the specimen dispensing volume are input, and the reagent dispensing operation is performed. After the reagent dispensing operation is completed, the reaction vessel 121 is collected from above the incubator 106, the absorbance is measured, and the reagent dispensing volume is calculated from the calibration curve.

The above is the dispensing volume measurement method in the first embodiment.

From the calculated dispensing volume, it becomes possible to calculate the accuracy and precision of the dispensing result. For example, the accuracy can be calculated as a difference between the true value and the average value of the dispensing volume, and the precision can be calculated as a variation coefficient obtained by dividing the standard deviation of the dispensing volume by the average value.

As described above, according to the first embodiment, while displaying the dispensing conditions such as the designation of the dispensing mechanism of which the dispensing accuracy is to be measured and the dispensing volume on the display unit 134, the dispensing conditions are set using the operating unit 133, and the automatic analysis apparatus can perform the set dispensing operation with respect to the reaction vessel or the like. The dispensing accuracy can be measured by collecting the reaction vessel 121, to which the reagent is dispensed, installed in the incubator 106 and measuring the dispensing volume of the reaction liquid in the collected reaction vessel 121 by an appropriate measuring method.

Accordingly, it is possible to provide the automatic analysis apparatus capable of setting the dispensing mechanism for measuring the dispensing accuracy and the dispensing volume, and capable of performing dispensing accuracy measurement without absorbance measurement.

Second Embodiment

Next, a second embodiment will be described.

In the first embodiment, the operator manually collects the reaction vessel 121 from the incubator 106, measures the weight or the like with an external device, and measures the dispensing volume, but the second embodiment is an example in which the weight measurement is possible inside the automatic analysis apparatus.

FIGS. 9A, 9B, and 9C are explanatory diagrams for showing an outline of the second embodiment and illustrating the weight measurement of the dispensing volume inside the automatic analysis apparatus. As shown in FIG. 9A, in the second embodiment, a weight sensor (weight measurement unit) 302 is disposed below the reaction vessel holding unit 108. A sensor having a resolution as high as possible is used as the weight sensor 302.

In addition, FIG. 10 is a block diagram of a control function of the control unit 102 for performing the dispensing volume measurement in the second embodiment.

In the block diagram of the control function shown in FIG. 10, a weight calculation unit 1029 and a memory 1030 are added to the block shown in FIG. 8. Other configurations are the same as those shown in FIG. 8.

Furthermore, the overall configuration of the immunoassay apparatus 101 according to the second embodiment is the same as the configuration shown in FIG. 1.

Next, a weight measurement method in the second embodiment will be described.

First, similar to the first embodiment, the operator designates the dispensing mechanism to be measured and inputs various parameters (dispensing conditions).

After this, the control unit 1023 measures the weight of the reaction vessel holding unit 108 including the unused reaction vessel 121 and the specimen dispensing tip 128 which are mounted thereon, by the weight sensor 302 disposed below the reaction vessel holding unit 108 and the weight calculation unit 1029, and stores the measured weight in the memory 1030 (FIG. 9B). The measured weight can be displayed on the display unit 134 via the display output unit 1022.

The transport mechanism 107 installs the unused reaction vessel 121 from the reaction vessel holding unit 108 in the incubator 106. After the operation of the transport mechanism 107, the weight of the reaction vessel holding unit 108 is measured by the weight sensor 302 and the weight calculation unit 1029, and is stored in the memory 1030. "The weight of the reaction vessel holding unit 108 before the operation of the transport mechanism 107—the weight of the reaction vessel holding unit 108 after the operation of the transport mechanism 107" is the weight of the unused reaction vessel 121 and is stored in the memory 1030.

After this, the designated dispensing operation is performed similar to the first embodiment.

After the operation of the designated dispensing mechanism is completed, the reaction vessel 121 to which the reagent is dispensed is installed on the incubator 106. In this state, the weight of the reaction vessel holding unit 108 is measured by the weight sensor 302 and is stored in the memory 1030. Next, the transport mechanism 107 installs the reaction vessel 121 to which the reagent is dispensed on the incubator 106 in the reaction vessel holding unit 108. After the installation of the reaction vessel 121 in the reaction vessel holding unit 108, the weight of the reaction vessel holding unit 108 is measured and is stored in the memory 1030 (FIG. 9C). "The total weight including the reaction vessel holding unit 108 after the operation of the transport mechanism 107—the total weight including the reaction vessel holding unit 108 before the operation of the transport mechanism 107" is the weight of the reaction vessel 121 to which the reagent is dispensed and is stored in the memory 1030.

The overall control unit 1023 measures (calculates) the weight of the dispensed liquid from "the weight of the reaction vessel 121 to which the reagent is dispensed—the weight of the unused reaction vessel 121". The dispensing volume can be calculated from the weight of the dispensed liquid and the specific gravity of the dispensed liquid, and the calculated dispensing volume is displayed on the display unit 134. Furthermore, the overall control unit 1023 calculates the accuracy and precision of the dispensing result from the calculated dispensing volume, and displays the dispensing result on the display unit 134 via the display output unit 1022.

The above is the weight measurement method in a case where the weight sensor 302 is mounted below the reaction vessel holding unit 108.

Alternatively, a weight sensor may be installed in the incubator 106. FIGS. 11A and 11B are views showing a configuration in a case where the weight sensor is installed in the incubator 106.

As shown in FIGS. 11A and 11B, a weight sensor 403 is disposed inside each of the reaction vessel installment positions 122 of the incubator 106.

Next, the weight measurement method in a case where the weight sensor 403 is installed inside the reaction vessel installment position 122 of the incubator 106 will be described. First, similar to the first embodiment, the operator designates the dispensing mechanism to be measured and inputs various parameters.

After this, the overall control unit 1023 measures the weight of the reaction vessel installment position 122 on the incubator 106 by the weight sensor 403, and stores the measured weight in the memory 1030 via the weight calculation unit 1029. The transport mechanism 107 installs the unused reaction vessel 121 from the reaction vessel holding unit 108 at the reaction vessel installment position 122 on the incubator 106. After the operation of the transport mechanism 107, the weight of the reaction vessel installment position 122 is measured again by the weight sensor 403 and is stored in the memory 1030. "The weight of the reaction vessel installment position 122 after the operation of the transport mechanism 107—the weight of the reaction vessel installment position 122 before the operation of the transport mechanism 107" is the weight of the unused reaction vessel 121, and the weight is stored in the memory 1030.

After this, the designated dispensing operation is performed similar to the first embodiment.

After the operation of the designated dispensing mechanism is completed, the reaction vessel 121 to which the reagent is dispensed is installed at the reaction vessel installment position 122 on the incubator 106. In this state, the weight of each reaction vessel installment position 122 is measured (FIG. 11B), and is stored in the memory 1030 in the automatic analysis apparatus.

The overall control unit 1023 measures the weight of the dispensed liquid from "the weight of the reaction vessel 121 to which the reagent is dispensed—the weight of the unused reaction vessel 121". The dispensing volume can be calculated from the weight of the dispensed liquid, and the calculated dispensing volume is displayed on the display unit 134. Furthermore, the overall control unit 1023 calculates the accuracy and precision of the dispensing result from the calculated dispensing volume, and displays the dispensing result on the display unit 134.

The above is the weight measurement method in a case where the weight sensor 403 is mounted in the incubator 106.

As described above, the same effect as that of the first embodiment can be obtained, and since the weight sensor 302 or 403 is installed in the automatic analysis apparatus, the weight is automatically measured, the accuracy and the precision of the dispensing result are calculated, and the dispensing result can be displayed on the display unit 134.

Third Embodiment

Next, a third embodiment will be described.

In the second embodiment, an example in which the dispensing volume is measured by the gravimetric method inside the automatic analysis apparatus is described, but since the automatic analysis apparatus operates a plurality of mechanisms simultaneously, there is a case where the weight measurement is not stable due to the influence of vibration. Here, the third embodiment is an example in which the reaction vessel transport mechanism for transporting the reaction vessel to the outside is provided in the automatic analysis apparatus, and the measurement is performed using an external weight meter.

FIG. 12 is a partial explanatory diagram of a configuration of the third embodiment. Other configurations are the same as those in the first embodiment. In the third embodiment, the automatic analysis apparatus 101 includes a weight meter 502 that is installed in a state of being separated from a main body of the automatic analysis apparatus 101. A weight meter having a resolution as high as possible is used as the weight meter 502.

A reaction vessel transport mechanism 503 is provided between the main body of the automatic analysis apparatus 101 and the weight meter 502, and has a structure that does not come into contact with the weight meter 502 in order to eliminate the influence of vibration. Similar to the above-described transport mechanism 107 of the first and second embodiments, the reaction vessel transport mechanism 503 can move in three directions of the X axis, the Y axis, and the Z axis and can move to the reaction vessel holding unit 108, the incubator 106, and the like. In addition, the reaction vessel transport mechanism 503 has the same function and movement range as those of the reaction vessel transport mechanism 107, and has a structure that can also transport the reaction vessel 121 to the weight meter 502 in addition to the movement range of the reaction vessel transport mechanism 107.

The weight meter 502 is connected to the control unit 102 of the automatic analysis apparatus 101 via a communication cable or the like, and the information communication between the weight meter 502 and the control unit 102 becomes possible.

FIG. 13 is a block diagram of a control function of the control unit 102 for performing the dispensing volume measurement in the third embodiment.

In the block diagram of the control function shown in FIG. 13, a transport mechanism control unit 103 is added to the block shown in FIG. 10. Other configurations are the same as those shown in FIG. 10. However, control lines between the overall control unit 1023 and the memory 1030 are omitted for convenience of illustration (the same is also applied to the following block diagram of the control function).

Next, a weight measurement method in the third embodiment will be described. First, similar to the above-described second embodiment, the operator designates the dispensing mechanism to be measured and inputs various parameters (dispensing conditions).

After this, the overall control unit 1023 causes the reaction vessel transport mechanism 503 to transport the unused reaction vessel 121 mounted on the reaction vessel holding unit 108 to the reaction vessel installation position 508 on the weight meter 502. After this, the overall control unit 1023 measures the weight of the unused reaction vessel 121 and stores the measured weight in the memory 1030 via the weight calculation unit 1029.

Next, the reaction vessel transport mechanism 503 installs the unused reaction vessel 121 in the incubator 106 from the reaction vessel installation position 508 of the weight meter 502. After this, the designated dispensing operation is performed similar to the first embodiment.

After the operation of the designated dispensing mechanism is completed, the reaction vessel 121 to which the reagent is dispensed is installed on the incubator 106. Next, the reaction vessel transport mechanism 503 transports the reaction vessel 121, to which the reagent is dispensed, installed in the incubator 106 to the reaction vessel installation position 508 of the weight meter 502. After the transport of the reaction vessel 121, the overall control unit 1023 measures the weight of the reaction vessel 121 to which the reagent is dispensed and stores the measured weight in the memory 1030.

"The weight of the reaction vessel 121 to which the reagent is dispensed—the weight of the unused reaction vessel 121" is calculated by the weight calculation unit 1029, and the calculated weight is the weight of the dispensed liquid and is stored in the memory 1030 in the apparatus. The overall control unit 1023 can calculate the dispensing volume from the weight of the dispensed liquid and the specific gravity of the dispensed liquid, and the dispensing volume is displayed on a display unit 510.

Furthermore, the accuracy and precision of the dispensing result are calculated from the calculated dispensing volume, and the dispensing result is displayed on the display unit.

The above is the weight measurement method by the weight meter 502 which is an external device by the reaction vessel transport mechanism 503.

According to the third embodiment, the same effect as that of the second embodiment can be obtained, and since the weight of the dispensing volume and the like is measured by the weight meter 502 outside the automatic analysis apparatus 101, without receiving the influence of vibration due to the mechanism in the automatic analysis apparatus, it is possible to measure the weight stably, and to improve the measurement precision of the dispensing volume.

Fourth Embodiment

Next, a fourth embodiment will be described.

In the above-described first to third embodiments, the method for operating only the designated dispensing operation is performed, but in a case where it is desired to perform a plurality of dispensing operations, there is a possibility that the dispensing operations take time. Therefore, in the fourth embodiment, a method for performing the plurality of dispensing operations in a series will be described.

FIG. 14 is an operation flowchart of the fourth embodiment. In addition, the overall configuration of the automatic analysis apparatus is the same as that of the example shown in FIG. 1, and the configuration of the control unit 102 may be any of the first to third embodiments.

In addition, the detailed operations are the same as those of the first, second, or third embodiment, and the description thereof will be omitted.

In FIG. 14, first, the operator installs the reaction vessel 121, the specimen dispensing tip 128, the reagent vessel 136, the specimen vessel 120, and the like in the automatic analysis apparatus.

After the installation of the specimen vessel 121 and the like, a plurality of measurement items are designated on the GUI of the display unit 134 (S601). The measurement item is configured with the reagent dispensing operation, the specimen dispensing operation, the specimen dilution dispensing operation, the B/F separation operation, and the detection reaction liquid suction operation, and any of the plurality of operations can be selected.

Next, parameter input is performed (S602). Similar to the first embodiment, the parameters that correspond to the measurement items can be input. In the case of the first embodiment, since the reaction vessel 121 is manually collected from the incubator 106, the upper limit of the total designated dispensing frequency is the maximum number of installation positions of the reaction vessel 121 of the incubator 106. In the case of the second and third embodiments, there is no upper limit on dispensing frequency.

After inputting the parameters in S602, the execution button is pressed and the dispensing operation of the designated item is performed. The control unit receives the input parameters, outputs the parameters to each mechanism in the automatic analysis apparatus to perform the dispensing operation (S603), and controls the operation.

Next, in S603A, it is determined whether or not the reagent dispensing operation is designated, and in a case where the reagent dispensing operation is designated, the process proceeds to S604. In addition, in S603A, in a case where the reagent dispensing operation is not designated, the process proceeds to S604A.

In S604, the reagent dispensing operation is performed, and then the process proceeds to S604A. In S604A, it is determined whether or not the specimen dispensing operation is designated. In S604A, in a case where the specimen dispensing operation is not designated, the process proceeds to S605A. In S604A, in a case where the specimen dispensing operation is designated, the process proceeds to S605, the specimen dispensing operation is performed, and the process proceeds to S605A.

In S605A, it is determined whether or not the specimen dilution dispensing operation is designated. When the specimen dilution dispensing operation is not designated, the process proceeds to S606A. In S605A, in a case where the specimen dilution dispensing operation is designated, the process proceeds to S606, the sample dilution dispensing operation is performed, and the process proceeds to S606A.

In S606A, it is determined whether or not the B/F separation operation is designated, and in a case where the B/F separation operation is not designated, the process proceeds to S607A. In S606A, in a case where it is determined that the B/F separation operation is designated, the process proceeds to step S607, the B/F separation operation is performed, and the process proceeds to step S607A.

In S607A, it is determined whether or not the detection reaction liquid suction operation is designated, and in a case where the detection reaction liquid suction operation is not designated, the measurement is finished or the dispensing volume is automatically measured.

In a case where the detection reaction liquid suction operation is designated in S607A, in S608, the detection reaction liquid suction operation is performed, and the measurement is finished or the dispensing volume is automatically measured.

In a case where the operation flow illustrated in FIG. 14 is applied to the configuration of the first embodiment, after the dispensing operation is completed, the operator collects the reaction vessel 121 to which the reagent is dispensed on the incubator 106 and measures the dispensing volume of the reaction liquid using any method.

In a case where the operation flow illustrated in FIG. 14 is applied to the configurations of the second and third embodiments, the dispensing volume is automatically measured from inside or outside the automatic analysis apparatus, and the dispensing volume is displayed on the display unit 134. Further, the accuracy and precision of the dispensing result are calculated from the calculated dispensing volume, and the dispensing result is displayed on the display unit 134.

The fourth embodiment of the method for performing a plurality of dispensing operations in a series has been described above.

According to the fourth embodiment, in a case where a plurality of designated dispensing operations are performed, the operations can be performed as a series of operations, and thus, there is an effect that confirmation of the dispensing volume can be efficiently executed in a short period of time.

Fifth Embodiment

Next, a fifth embodiment will be described.

In the above-described second and third embodiments, the automatic measurement method of the dispensing volume is shown inside and outside the automatic analysis apparatus, but only the dispensing volume measurement result is displayed on the display unit. The fifth embodiment is an example in which a function of displaying an alarm in a case where the dispensing result is out of the range of a prescribed determination criterion (determination threshold value) is added. The overall configuration of the automatic analysis apparatus is the same as that in FIG. 1.

FIG. 15 is a block diagram of a control function of the control unit 102 in the fifth embodiment.

In the block diagram of the control function shown in FIG. 15, a dispensing result determination unit 1032 is added between the weight calculation unit 1029 and the display output unit 1022 in the block shown in FIG. 10. Other configurations are the same as those shown in FIG. 10. In addition, the dispensing result determination unit 1032 can also be configured to be added between the weight calculation unit 1029 and the display output unit 1022 in FIG. 13.

In the fifth embodiment, the operator performs the same automatic measurement method as that in the second and third embodiments as a regular maintenance. Furthermore, the measurement time may be shortened by the method for performing a plurality of dispensing operations in a series as in the fourth embodiment.

After the dispensing volume is calculated by the weight calculation unit 1029 by the automatic measurement method, the dispensing result determination unit 1032 calculates the accuracy and precision of the dispensing volume and determines whether or not there is a problem with the dispensing result based on a prescribed criterion.

In a case where the dispensing result determination unit 1032 determines that the determination criterion is satisfied (normal), it is displayed that the dispensing operation is normal on the display screen of the display unit 134 via the display output unit 1022 as shown in FIG. 16. On the display screen shown in FIG. 16, "OK" is displayed to indicate that the determination result of each dispensing operation is normal, and "dispensing operation is normal" is displayed below.

Meanwhile, in a case where the determination criterion is not satisfied (abnormal), the dispensing result determination unit 1032 displays that the dispensing operation does not satisfy the determination criterion on the display screen of the display unit 134 via the display output unit 1022 as shown in FIG. 17. On the display screen shown in FIG. 17, "NG" is displayed to indicate that the determination result of the B/F separation operation is not normal, and "B/F separation operation is out of the range of the determination criterion" is displayed below. In other words, the control unit 102 determines that the dispensing volume is abnormal, and displays the determination result.

According to the fifth embodiment, the same effect as that of the second, third, and fourth embodiments can be obtained, and the operator can immediately determine the performance of the dispensing operation by the above-described alarm display function. Therefore, in a case where the determination criterion is not satisfied, it becomes possible to take measures such as replacing parts of the dispensing mechanism.

In the fifth embodiment, a correction method in the automatic measurement of the dispensing volume as in the second, third, and fourth embodiments has been described, but as in the first embodiment, the method for measuring the dispensing volume with an external device after manually collecting the reaction vessel 121 is also applicable.

In this case, after measuring the dispensing volume dispensed into the reaction vessel by the operation of the dispensing mechanism with an external device, the operator calculates the average value of the dispensing volume of the designated dispensing mechanism. After the calculation, the operator inputs the average value of the dispensing volume which is the calculation result from the GUI of the display unit 134.

Next, the dispensing result determination unit 1032 of the control unit 102 confirms whether or not the input average value is within the reference range. In a case where the average value is within the reference range, the display unit 134 displays that the average value is within the reference range. In a case where the average value is out of the reference range, the dispensing operation displays on the display screen of the display unit 134 that the determination criterion is not satisfied.

Sixth Embodiment

Next, a sixth embodiment will be described.

The fifth embodiment is an example of a method for performing the dispensing operation and determining the performance of the dispensing operation from the measurement result of the dispensing volume, but in the sixth embodiment, an example having a function of correcting the dispensing volume with respect to the dispensing mechanism based on the dispensing result is described. In addition, the overall configuration of the automatic analysis apparatus is the same as that of the example shown in FIG. 1.

FIG. 18 is an operation flowchart of the sixth embodiment. In addition, FIG. 19 is a block diagram of a control function of the control unit 102 in the sixth embodiment.

The block diagram of the control function shown in FIG. 19 shows an example in which a dispensing volume correction unit 1033 is added to the control function block of the fifth embodiment shown in FIG. 15.

In addition, the detailed operations are the same as those of the first embodiment, and the description thereof will be omitted.

First, an operator installs the reaction vessel 121, the specimen dispensing tip 128, the reagent vessel 136, and the like in the automatic analysis apparatus.

After the installation of the reaction vessel 121 and the like, the measurement items are designated on the GUI of the display unit 134 (S801). The measurement item can designate any of the reagent dispensing operation, the specimen dispensing operation, the specimen dilution dispensing operation, the B/F separation operation, and the detection reaction liquid suction operation.

Next, parameter input is performed (S802). Similar to the first embodiment, the parameters that correspond to the measurement items can be input. Furthermore, the frequency of dispensing operations can be set, and the calculation frequency which will be described later can also be set. For the calculation frequency, a value of 2 or larger can be input.

After inputting the parameters in S802, the execution button is pressed and the dispensing operation of the designated item is performed. The overall control unit 1023 receives the input parameters, outputs the parameters to each mechanism in the automatic analysis apparatus to perform the dispensing operation (S803), and controls the operation.

Next, the dispensing operation of which the frequency is designated is performed in the reagent dispensing operation, the specimen dispensing operation, the specimen dilution dispensing operation, the B/F separation operation, and the detection reaction liquid suction operation (S804).

After the dispensing operation in S804 is completed, the dispensing volume is automatically measured as shown in the second and third embodiments (S805).

After all dispensing operations in accordance with the measurement frequency (dispensing operation frequency)

are completed, the overall control unit 1023 calculates an average value of the dispensing volume of the designated dispensing operation (S806).

After performing the dispensing volume average value calculation S806, the overall control unit 1023 determines whether or not the average value of the dispensing volume is within the reference range (S806A). In S806A, it is determined whether or not the average value is within a reference range. Here, the reference range refers to a range of a preset dispensing volume that can be accepted as an automatic analysis apparatus from a true value. In S806A, in a case where the average value of the dispensing volume is within the reference range, the measurement operation is completed.

Meanwhile, in S806A, in a case where the average value of the dispensing volume is out of the reference range, the difference between the true value (reference value) and the average value is calculated (S807). Then, it is determined whether or not the calculation frequency of the average value of the dispensing volume at the present time is equal to or greater than the calculation frequency designated by the parameter input in S802 (S807A). In a case where the calculation frequency of the average value of the dispensing volume is equal to or greater than the designated calculation frequency, it is determined that dispensing is abnormal, an alarm is output to the display unit 134, and the automatic analysis apparatus is stopped.

In S807A, in a case where the calculation frequency of the average value of the dispensing volume is less than the designated calculation frequency, the dispensing volume correction unit 1033 converts the difference between the true value and the average value into a driving pulse number to a drive mechanism of the dispensing mechanism necessary for correcting the dispensing volume in accordance with the dispensing mechanism (S808).

After the conversion into the driving pulse number, the overall control unit 1023 transmits the driving pulse number to the drive mechanism of the designated dispensing mechanism (S809). Then, the analysis operation is performed again using the converted driving pulse number (S804).

The operation above is repeated until the average value of the dispensing volume is within the reference range. However, in a case where the calculation frequency set as described above is exceeded, an alarm is output on the display unit 134 and the automatic analysis apparatus is stopped.

As an example, a case will be described in which a dispensing mechanism having a resolution of 0.1 μL/pulse and a reference range of true value of ±5 μL is designated. In the dispensing mechanism, when the dispensing volume is designated as 60 μL in the parameter input of S802, the true value becomes 60 μL. After the automatic measurement of the dispensing volume (S805), in a case where the average value of the dispensing volume is 50 μL, the value is out of the reference range (60±5 μL) and the difference between the true value and the average value is 10 μL (60 μL−50 μL) is calculated.

Since the resolution is 0.1 μL/pulse, +100 pulses are calculated as the driving pulse number to reach the reference value. After the calculation, +100 pulses are added from the current pulse number to the drive mechanism of the dispensing mechanism, and the analysis operation is performed again.

The above is the method for correcting the dispensing volume to the dispensing mechanism based on the result of the dispensing operation in the sixth embodiment.

In the sixth embodiment, a correction method in the automatic measurement of the dispensing volume as in the second and third embodiments has been described, but as in the first embodiment, the method for measuring the dispensing volume with an external device after manually collecting the reaction vessel 121 is also applicable.

In this case, after measuring the dispensing volume dispensed into the reaction vessel by the operation of the dispensing mechanism with an external device, the operator calculates the average value of the dispensing volume of the designated dispensing mechanism. After the calculation, the operator inputs the average value of the dispensing volume which is the calculation result from the GUI of the display unit 134.

Next, the overall control unit 1023 of the control unit 102 confirms whether or not the input average value is within the reference range. In a case where the average value is within the reference range, the display unit 134 displays that the average value is within the reference range. In a case where the value is out of the reference range, the difference between the true value and the input average value is converted into the driving pulse number, the pulse number of the dispensing mechanism is transmitted to the drive mechanism, and the operation is completed.

The operation above is repeated until the average value of the dispensing volume is within the reference range.

Furthermore, the sixth embodiment is applicable to the method for performing a plurality of dispensing operations in a series as described in the fourth embodiment.

According to the sixth embodiment, the same effect as that of the fifth embodiment can be obtained, and further, an effect that the dispensing volume can be automatically corrected to an appropriate dispensing volume can be obtained.

Seventh Embodiment

Next, a seventh embodiment will be described.

The seventh embodiment is an example in which the reagent dispensing mechanism 112 and the specimen dispensing mechanism 105 are configured as one dispensing mechanism, and a diluent dispensing mechanism is separately disposed. Other configurations are the same as those of the seventh embodiment and the first embodiment.

FIG. 20 is a block diagram of a control function of the control unit 102 for performing the dispensing volume measurement in the seventh embodiment. In FIG. 20, the reagent dispensing operation control unit 1024 controls the reagent dispensing operation of a reagent and specimen dispensing mechanism 140, and the specimen dispensing operation control unit 1025 controls the specimen dispensing operation of the reagent and specimen dispensing mechanism 140. The reagent and specimen dispensing mechanism 140 is one dispensing mechanism that performs the operation of the reagent dispensing mechanism 112 and the operation of the specimen dispensing mechanism 105. Then, the specimen dilution dispensing operation control unit 1026 controls the operation of a diluent dispensing mechanism 150. The diluent dispensing mechanism 150 is a mechanism provided in the seventh embodiment.

In the first to sixth embodiments, the specimen dispensing mechanism 105 performs the specimen dispensing operation and the diluent dispensing operation, but in the seventh embodiment, the reagent and specimen dispensing mechanism 140 performs the reagent dispensing operation and the specimen dispensing operation, and the diluent dispensing mechanism 150 is configured to perform the liquid diluent dispensing operation. Other operation mechanisms 201 include the B/F separation reaction liquid suction mechanism 115, the buffer solution discharge mechanism 116, and the detection reaction liquid suction mechanism 118.

In the seventh embodiment, the same effect as that in the first embodiment can be obtained.

Eighth Embodiment

Next, an eighth embodiment will be described.

The eighth embodiment is an example in which the reagent dispensing mechanism 112, the specimen dispensing mechanism 105, and the diluent dispensing mechanism 150 are separately disposed. Other configurations are the same as those of the eighth embodiment and the first embodiment.

FIG. 21 is a block diagram of a control function of the control unit 102 for performing the dispensing volume measurement in the eighth embodiment. In FIG. 21, the reagent dispensing operation control unit 1024 controls the reagent dispensing operation of the reagent dispensing mechanism 112, and the specimen dispensing operation control unit 1025 controls the specimen dispensing operation of the specimen dispensing mechanism 105. Then, the specimen dilution dispensing operation control unit 1026 controls the operation of the diluent dispensing mechanism 150. The diluent dispensing mechanism 150 is a mechanism provided in the eighth embodiment similar to the seventh embodiment.

In the eighth embodiment, the reagent dispensing mechanism 112, the specimen dispensing mechanism 105, and the diluent dispensing mechanism 150 are provided. Other operation mechanisms 201 include the B/F separation reaction liquid suction mechanism 115, the buffer solution discharge mechanism 116, and the detection reaction liquid suction mechanism 118.

In the eighth embodiment, the same effect as that in the first embodiment can be obtained.

Ninth Embodiment

Next, a ninth embodiment will be described.

The ninth embodiment is an example in which the reagent dispensing mechanism 112, the specimen dispensing mechanism 105, and the diluent dispensing mechanism 150 in the eighth embodiment are configured as one reagent, specimen and diluent dispensing mechanism 160. Other configurations are the same as those of the ninth embodiment and the eighth embodiment.

FIG. 22 is a block diagram of a control function of the control unit 102 for performing the dispensing volume measurement in the ninth embodiment. In FIG. 22, the reagent dispensing operation control unit 1024 controls the reagent dispensing operation of the reagent, specimen and diluent dispensing mechanism 160, and the specimen dispensing operation control unit 1025 controls the specimen dispensing operation of the reagent, specimen and diluent dispensing mechanism 16. Furthermore, the specimen dilution dispensing operation control unit 1026 controls the diluent dispensing operation of the reagent, specimen and diluent dispensing mechanism 160.

In the ninth embodiment, other operation mechanisms 201 include the B/F separation reaction liquid suction mechanism 115, the buffer solution discharge mechanism 116, and the detection reaction liquid suction mechanism 118.

In the ninth embodiment, the same effect as that in the first embodiment can be obtained.

Although the above-described seventh to ninth embodiments are modification examples of the first embodiment, in each of the second to sixth embodiments, the reagent dispensing mechanism and the specimen dispensing mechanism are one dispensing mechanism, the diluent dispensing mechanism can also be disposed separately, and each of the reagent dispensing mechanism, the specimen dispensing mechanism, and the diluent dispensing mechanism can also be disposed separately. Furthermore, in each of the second to sixth embodiments, the reagent dispensing mechanism, the specimen dispensing mechanism, and the diluent dispensing mechanism can also be configured as a one reagent, specimen and diluent dispensing mechanism.

Tenth Embodiment

Next, a tenth embodiment will be described.

In the tenth embodiment, when any one of the reagent dispensing operation, the specimen dispensing operation, the specimen dilution dispensing operation, the B/F separation operation, and the detection reaction liquid suction operation, which are a plurality of measurement items, is input from the operating unit 133, the control unit 102 is an example that controls the dispensing mechanism used for performing the input measurement item.

Since the overall configuration of the immunoassay apparatus 101, which is the automatic analysis apparatus, is the same as that of the first embodiment, the illustration and detailed description will be omitted.

After controlling the dispensing mechanism used for performing the input measurement item, the control unit 102 finishes the processing of the immunoassay apparatus 101, which is the automatic analysis apparatus, after the reaction vessel 121 is installed in the incubator 106.

When the measurement item input from the operating unit 133 that serves as the input unit is the reagent dispensing operation, the control unit 102 controls the operation of the reagent dispensing mechanism 112 to suck the reagent from the reagent vessel 136 and discharge the reagent to the reaction vessel 121 installed in the incubator 106. Then, the control unit 102 finishes the processing (operation) of the immunoassay apparatus 101 in a state where the reaction vessel 121 to which the reagent is discharged is installed in the incubator 106.

Since the reaction vessel 121 to which the reagent is discharged is in a state of being installed in the incubator 106, the reaction vessel 121 is taken out, the weight is measured, and the reagent discharge amount (reagent suction amount) of the reagent dispensing mechanism 112 can be calculated when the weight of the reaction vessel 121 is subtracted.

In addition, when the measurement item input from the operating unit 133 that serves as the input unit is the specimen dispensing operation, the control unit 102 controls the operation of the specimen dispensing mechanism 112 to suck the specimen from the specimen vessel 120 and discharge the specimen to the reaction vessel 121 installed in the incubator 106. Then, the control unit 102 finishes the processing (operation) of the immunoassay apparatus 101 in a state where the reaction vessel 121 to which the specimen is discharged is installed in the incubator 106.

Since the reaction vessel 121 to which the specimen is discharged is in a state of being installed in the incubator 106, the reaction vessel 121 is taken out, the weight is measured, and the specimen discharge amount (specimen suction amount) of the specimen dispensing mechanism 105 can be calculated when the weight of the reaction vessel 121 is subtracted.

With respect to the specimen dilution dispensing operation, the B/F separation operation, and the detection reaction liquid suction operation, by performing the same operation as that described above, the discharge amount (suction amount) of each dispensing mechanism can be calculated.

In addition, a vessel that contains the liquid that corresponds to the measurement item input from the operating unit 133 that serves as the input unit can be defined as a first vessel, and a vessel that discharges the liquid sucked from the first vessel can be defined as a second vessel.

When the measurement item is the reagent dispensing operation, the item is the first measurement item, the first vessel is the reagent vessel 136, and the second vessel is the reaction vessel 121. The dispensing mechanism is the reagent dispensing mechanism 112.

When the measurement item is the specimen dispensing operation, the item is the first measurement item, the first vessel is the specimen vessel 120, and the second vessel is the reaction vessel 121. The dispensing mechanism is the specimen dispensing mechanism 105. In addition, as the first vessel, there is a diluent vessel for containing the diluent. The diluent vessel can also be used as the specimen vessel 120.

Further, the dispensing mechanism related to the first measurement item can be defined as a first dispensing mechanism, and the other mechanism can be defined as a second dispensing mechanism. For example, when the first measurement item is a specimen dispensing operation, the first dispensing mechanism related thereto is the specimen dispensing mechanism 105 and the reagent dispensing mechanism 112.

Furthermore, one of the first dispensing mechanisms can be a first dispensing mechanism, and the other one can be a second dispensing mechanism.

For example, when the first measurement item is a specimen dispensing operation, the first dispensing mechanism can be the specimen dispensing mechanism 105 or the reagent dispensing mechanism 112, and the second dispensing mechanism can be the reagent dispensing mechanism 112 or the specimen dispensing mechanism 105.

In the tenth embodiment, the same effect as that in the first embodiment can be obtained.

In the present application, the specimen dispensing mechanism 105, the reagent dispensing mechanism 112, the B/F separation mechanism 114, and the detection reaction liquid suction mechanism 118 are collectively referred to as a dispensing mechanism. The display unit 134 can also serve as an operation unit by including a touch panel and the like. Therefore, the display unit 134 and the operating unit 133 can be collectively referred to as an input unit that receives the operation of the dispensing mechanism.

In the present application, the reagent, the specimen, the diluent, the diluted specimen, and the buffer solution are collectively referred to as liquid.

In addition, as parts that can measure the discharge amount of the liquid discharged to the second vessel such as the reaction vessel, there are the incubator 106, the reaction vessel holding unit 108, and the weight meter 502, but the incubator 106, the reaction vessel holding unit 108, and the weight meter 502 can be defined as a generation unit that generates a situation in which the discharge amount to the second vessel can be measured and a generation unit that generates a situation in which the suction amount from the dispensing vessel can be measured.

REFERENCE SIGNS LIST

101: immunoassay apparatus (automatic analysis apparatus)
102: control unit
103: specimen rack
104: rack transport line
105: specimen dispensing mechanism
106: incubator (reaction disk)
107, 503: reaction vessel transport mechanism
108: reaction vessel holding unit
109: reaction vessel stirring mechanism
110: disposal hole
111: reagent disk
112: reagent dispensing mechanism
113: B/F separation transport mechanism
114: B/F separation mechanism
115: B/F separation reaction liquid suction mechanism
116: buffer solution discharge mechanism
117: post B/F separation stirring mechanism
118: detection reaction liquid suction mechanism
119: detection unit (analysis unit)
120: specimen vessel
121: reaction vessel
122: reaction vessel installment position
123: reagent discharge position
124: specimen discharge position
125: detection reaction liquid suction position
126: reaction vessel disposal position
127: B/F separation transport position
128: specimen dispensing tip
129: tip mounting position
130: reagent disc cover
131: aperture
132: liquid transport channel
133: operating unit
134: display unit
135: storage unit
140: reagent and specimen dispensing mechanism
150: diluent dispensing mechanism
160: reagent, specimen and diluent dispensing mechanism
201: other operation mechanism
302, 403: weight sensor
200: operation mechanism
502: weight meter
508: reaction vessel installation position on weight meter
1021: measurement item determination unit
1022: display output unit
1023: overall control unit
1024: reagent dispensing operation control unit
1025: specimen dispensing operation control unit
1026: specimen dilution dispensing operation control unit
1027: B/F separation operation control unit
1028: detection reaction liquid suction operation control unit
1029: weight calculation unit
1030: memory
1031: transport mechanism control unit
1032: dispensing result determination unit
1033: dispensing volume correction unit

The invention claimed is:
1. An automatic analysis system, comprising:
a dispensing mechanism configured to suck liquid from a first vessel, move to a liquid discharge position, and discharge the liquid to a second vessel disposed in the liquid discharge position;

a vessel installment unit configured to hold the second vessel in the liquid discharge position during the discharge of the liquid and subsequently move the second vessel to a detection reaction liquid suction position;

a detection reaction liquid suction mechanism configured to suck the liquid from the second vessel disposed in the detection reaction liquid suction position;

an analysis unit configured to analyze the liquid, which is received from the detection reaction liquid suction mechanism;

an input unit configured to receive an operation command of the dispensing mechanism;

a control unit configured to control the dispensing mechanism based on the operation command received by the input unit; and a weight meter configured to measure a discharge amount of the liquid discharged to the second vessel;

wherein the control unit is configured to end a measurement operation by the weight meter based on a determination that discharging the liquid to the second vessel is complete and a determination that the first vessel is disposed in the vessel installment unit.

2. The automatic analysis system according to claim 1, further comprising the first vessel, wherein the first vessel contains a reagent, a specimen or a diluent.

3. The automatic analysis system according to claim 1, wherein the input unit is configured to receive an input of the discharge amount or a suction amount of the liquid.

4. The automatic analysis system according to claim 1, wherein the input unit is configured to receive an input of an operation frequency of the dispensing mechanism.

5. The automatic analysis system according to claim 1, further comprising a display unit;

wherein the input unit is configured to receive a measurement result of the discharge amount or a suction amount of the liquid, and the control unit is configured to determine whether the measurement result of the discharge amount or the suction amount, which is received by the input unit, is normal or abnormal based on a preset determination threshold value, and to cause the display unit to display whether the measurement result is normal or abnormal.

6. The automatic analysis system according to claim 1, wherein the input unit is configured to receive a measurement result of the discharge amount or a suction amount of the liquid, and the control unit is configured to control the discharge amount or the suction amount of the liquid based on the measurement result of the discharge amount or the suction amount.

7. The automatic analysis system according to claim 1, wherein the vessel installment unit is an incubator, and the control unit is configured to control stopping of a temperature control of the incubator.

8. The automatic analysis system according to claim 1, further comprising:

a holding unit configured to hold an uncontained vessel in which liquid is not contained; and a transport mechanism configured to be movable within a range of a predetermined location of the holding unit and to transport the uncontained vessel from the holding unit to the vessel installment unit.

9. The automatic analysis system according to claim 8, further comprising:

a weight sensor disposed below the holding unit; and a display unit configured to communicate with the control unit;

wherein the control unit is configured to cause the weight sensor to measure a weight of the uncontained vessel and a weight of a contained vessel in which liquid is contained to calculate the discharge amount or a suction amount of the liquid, and to cause the display unit to display the discharge amount or the suction amount.

10. The automatic analysis system according to claim 9, wherein the weight sensor is disposed within the holding unit or the vessel installment unit.

11. The automatic analysis system according to claim 9, further comprising:

an transport mechanism configured to transport the uncontained vessel or the contained vessel disposed in the automatic analysis system to outside of a main body of the automatic analysis system, wherein the control unit is configured to cause the transport mechanism to transport the uncontained and the contained vessel to the weight sensor, to cause the weight sensor to measure a weight of the uncontained vessel and a weight of the contained vessel to calculate a calculated discharge amount or a calculated suction amount of the liquid, and to cause the display unit to display the calculated discharge amount or the calculated suction amount.

12. The automatic analysis system according to claim 11, wherein the control unit is configured to determine whether a measurement result of the discharge amount or the suction amount of the liquid is normal or abnormal based on a preset determination threshold value, and to cause the display unit to display whether the measurement result is normal or abnormal.

13. The automatic analysis system according to claim 11, wherein the control unit is configured to control the discharge amount or the suction amount of the liquid based on the measurement result.

14. An automatic analysis system, comprising:

a suction mechanism configured to suck liquid from a dispensing vessel;

an analysis unit configured to analyze the liquid, which is received from the suction mechanism;

a vessel installment unit configured to hold the dispensing vessel in a liquid discharge position during suction of the liquid and subsequently to move the dispensing vessel to a detection reaction liquid suction position;

an input unit configured to receive an operation command of the suction mechanism;

a control unit configured to control the dispensing mechanism based on the operation command received by the input unit; and a weight meter configured to measure a suction amount of the liquid sucked from the dispensing vessel;

wherein the control unit is configured to end a measurement operation by the weight meter based on a determination that sucking of the liquid from the dispensing vessel is complete and a determination that the dispensing vessel is disposed in the vessel installment unit.

15. The automatic analysis system according to claim 14, further comprising the dispensing vessel, wherein the liquid in the dispensing vessel includes any one of a mixed solution of a reagent and a specimen, a diluted specimen solution, and a B/F separation buffer solution.

16. An automatic analysis system, comprising:

a first dispensing mechanism configured to suck a reagent from a reagent vessel, move to a reagent discharge position, and discharge the reagent to a dispensing vessel;

a second dispensing mechanism configured to suck a specimen from a specimen vessel, move to a specimen discharge position, and discharge the specimen to the dispensing vessel;

an analysis unit configured to analyze liquid, including the reagent and the specimen, in the dispensing vessel;

a vessel installment unit configured to hold the dispensing vessel;

an input unit configured to receive an operation command of the first or second dispensing mechanism;

a control unit configured to control the first or second dispensing mechanism based on the operation command received by the input unit; and a weight meter configured to measure a suction amount of the liquid from the dispensing vessel;

wherein the control unit is configured to end a measurement operation by the weight meter based on a determination that a sucking operation of the first dispensing mechanism or the second dispensing mechanism is complete and a determination that the dispensing vessel is installed on the vessel installment unit.

17. The automatic analysis system according to claim 16, further comprising a third dispensing mechanism disposed in the automatic analysis apparatus and configured to discharge a B/F separation buffer solution to the dispensing vessel.

18. The automatic analysis system according to claim 16, wherein the input unit includes an operating unit and a display unit.

19. An automatic analysis system, comprising:

a first dispensing mechanism configured to suck a reagent from a reagent vessel, move to a reagent discharge position, and discharge the reagent to a dispensing vessel, and further to suck a diluent from a diluent vessel, move to a diluent discharge position and discharge the diluent to the dispensing vessel;

a second dispensing mechanism configured to suck a specimen from a specimen vessel, move to a specimen discharge position, and discharge the specimen to the dispensing vessel;

an analysis unit configured to analyze liquid, including the reagent, the diluent and the specimen, in the dispensing vessel;

a vessel installment unit configured to hold the dispensing vessel;

an input unit configured to receive an operation command of the first or second dispensing mechanism;

a control unit configured to control the first or second dispensing mechanism based on the operation command received by the input unit; and a weight meter configured to measure a suction amount of the liquid from the dispensing vessel;

wherein the control unit is configured to end a measurement operation by the weight meter based on a determination that a sucking operation of the first dispensing mechanism or the second dispensing mechanism is complete and a determination that the dispensing vessel is installed on the vessel installment unit.

20. An automatic analysis system, comprising:

a plurality of dispensing mechanisms, each of which is configured to suck liquid from a first vessel, move to a liquid discharge position, and discharge the liquid to a second vessel;

an analysis unit configured to analyze the liquid contained in the second vessel;

an input unit configured to receive an input of any one of a plurality of measurement items;

an incubator configured to react the liquid contained in the second vessel; and a control unit configured to control the plurality of dispensing mechanisms and the analysis unit;

wherein the control unit is configured to control, when the input unit receives an input of a first measurement item from the plurality of measurement items, fora first dispensing mechanism of the plurality of dispensing mechanisms, and to end an analysis operation of the analysis unit based on a determination that the second vessel is installed on the incubator and a determination that the control of the first dispensing mechanism is complete.

21. The automatic analysis system according to claim 20, wherein the first measurement item corresponds to a reagent dispensing operation, and the first vessel contains a reagent.

22. The automatic analysis system according to claim 20, wherein the first measurement item corresponds to a specimen dispensing operation and the first vessel contains a specimen, and the first dispensing mechanism is configured to dispense a reagent to the second vessel, and a second dispensing mechanism of the plurality of dispensing mechanisms is configured to dispense a specimen to the second vessel.

* * * * *